United States Patent [19]

Yokoyama et al.

[11] Patent Number: 5,623,606
[45] Date of Patent: *Apr. 22, 1997

[54] COMMUNICATION CONTROL METHOD AND APPARATUS FOR PERFORMING HIGH SPEED TRANSFER OF DATA BY CONTROLLING TRANSFER STARTING TIMES

[75] Inventors: Tatsuya Yokoyama, Machida; Tetsuhiko Hirata, Yokohama; Mika Mizutani, Tokyo, all of Japan

[73] Assignee: Hitachi, Ltd., Tokyo, Japan

[*] Notice: The term of this patent shall not extend beyond the expiration date of Pat. No. 5,297,139.

[21] Appl. No.: 968,589

[22] Filed: Oct. 29, 1992

[30] Foreign Application Priority Data

Oct. 31, 1991 [JP] Japan .................................. 3-285975

[51] Int. Cl.⁶ .............................. G06F 13/00; H04J 3/14
[52] U.S. Cl. .......................................... 395/250; 395/872
[58] Field of Search ................... 370/60, 60.1; 395/250, 395/872, 878; 375/118

[56] References Cited

U.S. PATENT DOCUMENTS

| | | | |
|---|---|---|---|
| 4,175,287 | 11/1979 | Fuhrman | 395/411 |
| 4,285,038 | 8/1981 | Suzuki et al. | 395/250 |
| 4,434,498 | 2/1984 | Mathieu | 375/365 |
| 4,525,831 | 7/1985 | Simmons et al. | 370/63 |
| 4,845,710 | 7/1989 | Nakamura et al. | 370/110.1 |
| 4,849,969 | 7/1989 | Annamalai | 370/100.1 |
| 4,945,548 | 7/1990 | Iannarone et al. | 375/214 |
| 5,185,853 | 2/1993 | Hamstra et al. | 395/250 |
| 5,297,139 | 3/1994 | Okura et al. | 370/60 |

FOREIGN PATENT DOCUMENTS 61-063139  4/1986  Japan .
3-125538   5/1991  Japan .

*Primary Examiner*—Parshotam S. Lall
*Assistant Examiner*—Viet Vu
*Attorney, Agent, or Firm*—Antonelli, Terry, Stout & Kraus, LLP

[57] ABSTRACT

In a communication control equipment for transmitting data in an external predetermined memory to a network, there are provided a buffer memory unit for temporarily holding the data transferred thereto, a data transfer unit for performing a data transfer between the predetermined memory and the buffer memory unit, a unit for executing a protocol processing with regard to data held in the buffer memory unit, a control unit for controlling a transmission of the data processed by the protocol processing to the network, and a unit for producing a transmission start instruction at a start time instant within a range defined from a time instant when 1-packet data transfer from the predetermined memory to the buffer memory unit is commenced until a time instant when this data transfer is completed. The transmission start instruction is produced under a condition that the lower a data transfer speed from the predetermined memory to the buffer memory unit is relative to a transmission speed of the network, the later the start time instant is. A unit is also provided for causing the control unit to commence the transmission of the data processed by the protocol processing to the network at a later time instant during the time instant when the transmission start instruction is produced and the time instant when the protocol processing is terminated.

16 Claims, 19 Drawing Sheets

FIG. 5

| DATA TRANSFER SPEED RELATIONSHIPS | DATA TRANSFER START TIMING TO NETWORK |
|---|---|
| HOST DMA SPEED > TRANSFER SPEED | JUST AFTER START OF HOST DMA |
| HOST DMA SPEED ≒ TRANSFER SPEED | AT 1/4 OF END OF HOST DMA |
| HOST DMA SPEED < TRANSFER SPEED | AT 1/2 OF END OF HOST DMA |
| HOST DMA SPEED ≪ TRANSFER SPEED | AT 3/4 OF END OF HOST DMA |

COMMUNICATION CONTROL METHOD AND APPARATUS FOR PERFORMING HIGH SPEED TRANSFER OF DATA BY CONTROLLING TRANSFER STARTING TIMES

CROSS-REFERENCE TO RELATED APPLICATION

This application relates to U.S. Ser. No. 07/659,705 filed Feb. 25, 1991, now U.S. Pat. No. 5,303,344 entitled "HIGH SPEED PROTOCOL PROCESSING APPARATUS" filed by Tatsuya Yokoyama et al. assigned to the present assignee, based on Japanese Application No. 2-41005 filed and No. 2-311494 filed and the contents of which are incorporated herein by reference.

BACKGROUND OF THE INVENTION

The present invention generally relates to a communication control equipment and a communication control method for connecting a computer or the like to a network. More specifically, the present invention is directed to a communication control equipment and a communication control method capable of performing a highspeed data transmission process from the computer or the like to the network. Also, the present invention is related to a data transfer equipment and a data transfer method used in the above-described communication control equipment and communication control method.

As the conventional method for reducing data transmission process time with respect to the data transmission request issued from the host layer (user), for instance, Japanese patent publication JP-A-3-125538 entitled "PACKET DIVIDING METHOD" is known. In this conventional method, when transmission data from the host layer is subdivided into a plurality of packets and then these packets are transmitted to the network, the data packet is sent out to the network at a time instant that the transmission data amount received from the host layer has reached the maximum packet length of the divided data packet without waiting for the completion of receiving all transmission data, so that transmission delay time is reduced.

Thus, in accordance with the above-described conventional method, the data transfer operation to the network is commenced before the reception of all transmission data is accomplished. When attention is paid to a certain packet corresponding to the unit of the data transmission to the network, the data is transferred to the network after 1-packet data has been received. As a consequence, this conventional communication control method becomes effective if such a network whose maximum packet length is short is employed. However, with respect to a network whose maximum packet length is great, the delay time measured until the packet is sent out to the network, is still long.

SUMMARY OF THE INVENTION

An object of the present invention is to provide a communication control equipment and a communication control method capable of sending out a packet to a network within a short time, and also to provide a data transfer equipment and a data transfer method used in the communication control equipment/method.

Another object of the present invention is to provide a communication control equipment and a communication control method capable of transmitting a packet at high speed, while preventing an occurrence of an underrun (namely, such a phenomenon that during a data transmission to a network, data to be sent to the network has not yet been transferred from a host layer to an internal circuit of a communication control apparatus) as much as possible even when the data receiving speed from the host layer is lower than the transfer speed of the network.

A further object of the present invention is to provide a communication control equipment and a communication control method capable of transmitting a packet at a high speed, while preventing an occurrence of an underrun as much as possible even under such an environment that data from a host layer is received via a system bus or the like of a computer, and the data reception is dynamically varied due to a load variation in the system bus or the like, and also to provide a data transfer equipment and a data transfer method utilizing the communication control equipment/method.

A still further object of the present invention is to provide a communication control equipment and a communication method capable of no problem during data transmission to a network even when the above-described underrun occurs, as well as to provide a data transfer equipment and a data transfer method using the above-described communication control equipment/method.

To achieve the above-described objects, a communication control equipment, according to one aspect of the present invention, for transmitting data in an external predetermined memory to a network, includes:

a buffer memory unit for temporarily holding the data transferred thereto;

a data transfer unit for performing a data transfer between the predetermined memory and the buffer memory unit;

a unit for executing a protocol processing with regard to data held in the buffer memory unit;

a control unit for controlling a transmission of the data processed by the protocol processing to the network;

a unit for producing a transmission start instruction at a start time instant within a range defined from a time instant when 1-packet data transfer from the predetermined memory to the buffer memory unit is commenced until a time instant when this data transfer is accomplished, under such a condition that the lower a data transfer speed from the predetermined memory to the buffer memory unit is relative to a transmission speed of the network, the later the start time instant is; and a unit for causing the control unit to commence the transmission of the data processed by the protocol processing to the network at a later time instant among the time instant when the transmission start instruction is produced and the time instant when the protocol processing is terminated.

In accordance with this communication control equipment, since the transmission start instruction is produced at the time instant within the range from the time instant when the 1-packet data from the predetermined memory unit to the buffer memory unit until the time instant when this 1-packet data transfer operation is completed, the data transmission to the network is commenced before the 1-packet data transfer operation from the predetermined memory to the buffer memory unit has been completed. As a result, the data transmission to the network can be performed at a high speed. Since the transmission start instruction is produced at the late time instant under such a condition that the data transfer speed from the predetermined memory to the buffer memory unit is relatively delayed with respective to the transfer speed of the network, the occurrence of the underrun can be prevented as much as possible.

The above-described unit for producing the transmission start instruction may include:

a unit for receiving all data amount information indicative of all data amount for the 1-packet data;

a unit for obtaining remaining data amount information indicative of a remaining data amount based on the all data amount information, which corresponds to an amount of data among the 1-packet data, which has not yet been transferred to the buffer memory unit;

a unit for obtaining a reference data amount information indicative of a reference data amount less than or equal to the all data amount, under such a condition that the later the data transfer speed from the predetermined memory to the buffer memory unit is relatively with regard to the transmission speed of the network, the less said reference data amount is; and a unit for comparing the remaining data amount information with the reference data amount information and for producing the transmission start instruction when the remaining data amount becomes less than or equal to the reference data amount. In this case, the producing timing of the transmission start instruction is determined not by the elapsed time from the time instant when the 1-packet data transfer operation from the predetermined memory is commenced, but by the remaining data amount information. As a consequence, the data reception from the host layer is performed via the system bus of the computer or the like, and then the occurrence of such an underrun can be prevented as much as possible even under environment that the data receiving speed is dynamically varied due to the load variations of the system bus or the like.

The above-described unit for producing the transmission start instruction may include:

a unit for receiving all data amount information indicative of all data amount for the 1-packet data;

a unit for obtaining passed data amount information indicative of a passed data amount based upon the all data amount information, which corresponds to an amount of data among the 1-packet data, which has been transferred to the buffer memory unit;

a unit for obtaining reference data amount information indicative of a reference data amount less than or equal to the all data amount, under such a condition that the lower the data transfer speed from the predetermined memory to the buffer memory unit is relatively with regard to the transmission speed of the network, the more the reference data amount is; and a unit for comparing the passed data amount information with the reference data amount information and for producing the transmission start instruction when the passed data amount becomes more than or equal to the reference data amount. In this case, the producing timing of the transmission start instruction is determined not by the elapsed time from the time instant when the 1-packet data transfer operation from the predetermined memory is commenced, but by the passed data amount information. As a result, also in this case, the occurrence of the underrun can be prevented as much as possible even in such an environment that the data receiving speed is dynamically changed due to the load variation of the system bus or the like.

The above-explained unit for producing the transmission start instruction may include:

a unit for receiving all data amount information indicative of all data amount for the 1-packet data;

a unit for obtaining remaining data amount information indicative of a remaining data amount based on the all data amount information, which corresponds to an amount of data among the 1-packet data, which has not yet been transferred to the buffer memory unit;

a unit for holding reference ratio information indicative of a reference ratio corresponding to a ratio of the remaining data amount to the all data amount, under such a condition that the lower the data transfer speed from the predetermined memory to the buffer memory unit is relatively with respect to the transmission speed of the network, the less the reference ratio is;

a unit for obtaining reference data amount information representative of a product of the all data amount and the reference ratio based upon both of the all data amount information and the reference ratio information; and a unit for comparing the remaining data amount information with the reference data amount information and for producing the transmission start instruction when the remaining data amount becomes less than or equal to the reference data amount. In this case, the producing of the timing of the transmission start instruction is determined not by the elapsed time from the time instant when the 1-packet data transfer operation from the predetermined memory is commenced, but by the remaining data amount information. As a consequence in this case, the occurrence of such an underrun can be prevented as much as possible even under an environment that the data receiving speed is dynamically varied due to the load variations of the system bus or the like.

The above-described unit for producing the transmission start instruction may include:

a unit for receiving all data amount information indicative of all data amount for the 1-packet data;

a unit for obtaining passed data amount information indicative of a passed data amount based upon the all data amount information, which corresponds to an amount of data among the 1-packet data, which has been transferred to the buffer memory unit;

a unit for holding reference ratio information indicative of a reference ratio corresponding to a ratio of the passed data amount to the all data amount, under such a condition that the lower the data transfer speed from the predetermined memory to the buffer memory unit is relative to the transmission speed of the network, the more the reference ratio is;

a unit for obtaining reference data amount information representative of a product of the all data amount and the reference ratio based upon both of the all data amount information and the reference ratio information; and a unit for comapring the passed data amount information with the reference data amount information and for producing the transmission start instruction when the passed data amount becomes more than or equal to the reference data amount. In this case, the producing timing of the transmission start instruction is determined not by the elapsed time from the time instant when the 1-packet data transfer operation from the predetermined memory is commenced, but by the passed data amount information. As a result, also in this case, the occurrence of the underrun can be prevented as much as possible even in an environment that the data receiving speed is dynamically changed due to the load variation of the system bus or the like.

The above-described communication control equipment may further include:

a unit for detecting an occurrence of an underrun; and a unit, responsive to the occurrence of the underrun, for causing the control unit to interrupt the data transfer operation to the network, and subsequently for causing the control unit to retransmit data corresponding to the 1-packet data related to the occurrence of the underrun, and the data being processed by the protocol processing. In this case, even when the underrun occurs, there is no problem in the data transmission to the network.

The above-explained communication control equipment may further include:

a unit for causing the data transfer unit to execute a data transfer from the predetermined memory to the buffer memory unit only when data can be transmitted to the network.

A communication control method according to another aspect of the present invention employs a communication control equipment for transmitting data in an external predetermined memory to a network. The communication control equipment includes:

a buffer memory unit for temporarily holding the data transferred thereto;

a data transfer unit for performing a data transfer between the predetermined memory and the buffer memory unit;

a unit for executing a protocol processing with regard to data held in the buffer memory unit; and a control unit for controlling a transmission of the data processed by the protocol processing to the network.

Then, the above-explained communication control method includes the steps of:

producing a transmission start instruction at a start time instant within a range defined from a time instant when 1-packet data transfer from the predetermined memory to the buffer memory unit is commenced until a time instant when this data transfer is accomplished, under such a condition that the lower a data transfer speed from the predetermined memory to the buffer memory unit is relative to a transmission speed of the network, the later the start time instant is; and causing the control unit to commence the transmission of the data processed by the protocol processing to the network at a later time instant during the time instant when the transmission start instruction is produced and the time instant when the protocol processing is terminated.

In accordance with another aspect of the present invention, a data transfer equipment for transferring data stored in a first memory space to a second memory space, includes:

a unit for receiving all data amount information indicative of all data amount of 1-packet transfer data;

a unit for obtaining remaining data amount information indicative of a remaining data amount based on the all data amount information, which corresponds to an amount of data among the 1-packet transfer data, which has not yet been transferred to the second memory space;

a unit for holding reference data amount information indicative of a reference data amount externally designated, the reference data amount being less than or equal to the all data amount; and a unit for comparing the remaining data amount information with the reference data amount information and for producing a signal when the remaining data amount becomes less than or equal to the reference data amount.

This data transfer equipment may be employed in the above-explained communication control equipment and the like.

In accordance with a further aspect of the present invention, a data transfer equipment for transferring data stored in a first memory space to a second memory space, includes:

a unit for receiving all data amount information indicative of all data amount of 1-packet transfer data;

a unit for obtaining passed data amount information indicative of a passed data amount based upon the all data amount information, which corresponds to an amount of data among the 1-packet transfer data, which has been transferred to the second memory space;

a unit for holding reference data amount information indicative of a reference data amount externally designated, the reference data amount being less than or equal to the all data amount; and a unit for comparing the passed data amount information with the reference data amount information and for producing a signal when the passed data amount becomes more than or equal to the reference data amount.

This data transfer equipment may also be employed in the above-described communication control equipment and the like.

In accordance with a further aspect of the present invention, a data transfer equipment for transferring data stored in a first memory space to a second memory space, includes:

a unit for receiving all data amount information indicative of all data amount of 1-packet transfer data;

a unit for obtaining remaining data amount information indicative of a remaining data amount based on the all data amount information, which corresponds to an amount of data among the 1-packet transfer data, which has not yet been transferred to the second memory space;

a unit for holding reference ratio information indicative of an externally designated reference ratio corresponding to a ratio of the remaining data amount to the all data amount;

a unit for obtaining reference data amount information indicative of a product of the all data amount and the reference ratio based upon both of the all data amount information and the reference ratio information; and a unit for comparing the remaining data amount information with the reference data amount information and for producing a signal when the remaining data amount becomes less than or equal to the reference data amount. This data transfer equipment may also be employed in the above-described communication control equipment and the like.

In accordance with a still further aspect of the present invention, a data transfer equipment for transferring data stored in a first memory space to a second memory space, includes:

a unit for receiving all data amount information indicative of all data amount of 1-packet transfer data;

a unit for obtaining passed data amount information indicative of a passed data amount based upon the all data amount information, which corresponds to an amount of data among the 1-packet transfer data, which has been transferred to the second memory space;

a unit for holding reference ratio information indicative of an externally designated reference ratio corresponding to a ratio of the passed data amount to the all data amount;

a unit for obtaining reference data amount information indicative of a product of the all data amount and the reference ratio based upon both of the all data amount information and the reference ratio information; and a unit for comparing the passed data amount information with the reference data amount information and for producing a signal when the passed data amount becomes more than or equal to the reference data amount.

Also, this data transfer equipment may be employed in the above-described communication apparatus and the like.

BRIEF DESCRIPTION OF THE DRAWINGS

FIG. 5 shows one example of data transmission start timing to the network;

DESCRIPTION OF THE PREFERRED EMBODIMENTS

Referring now to drawings, various preferred embodiments of the present invention will be described.

(Preferred Embodiment 1)

Figure 2:
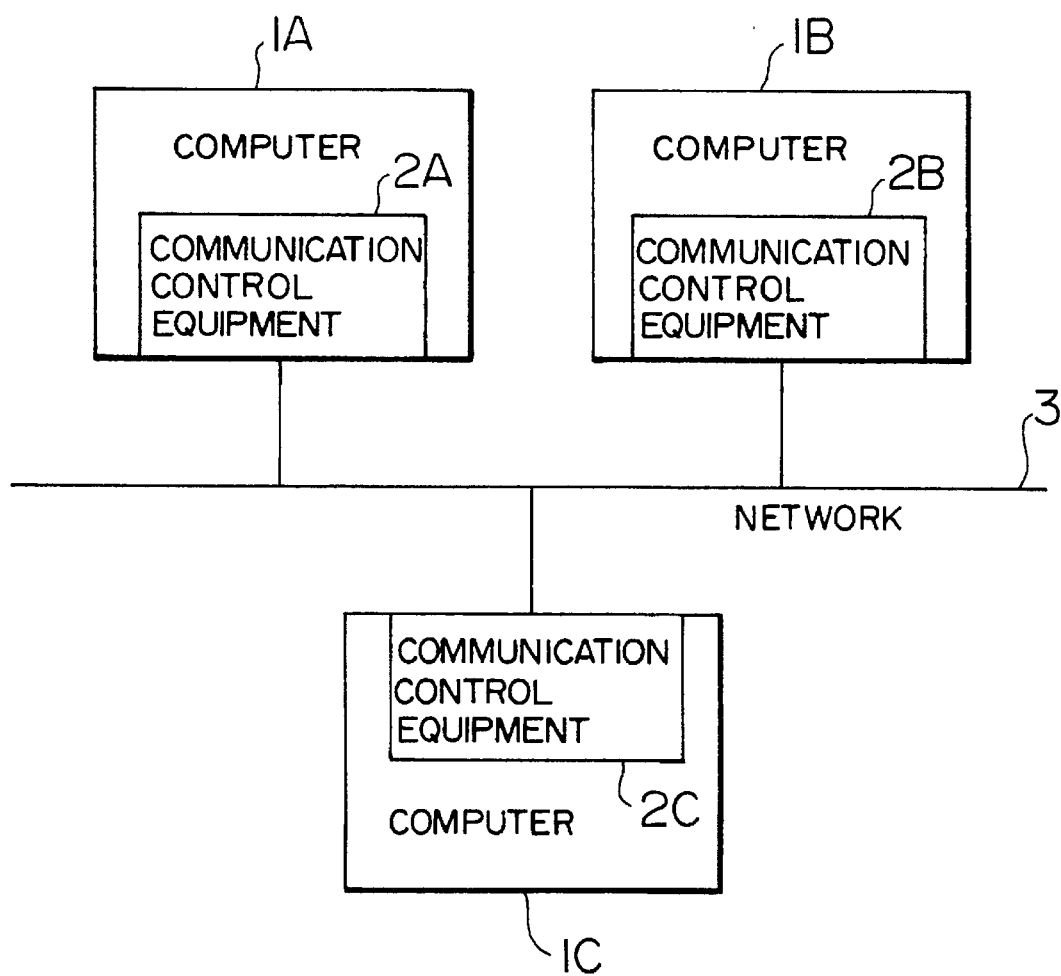
FIG. 2 is a schematic block diagram for showing one example of a network system directed to the present invention.

FIG. 2 is a schematic block diagram for showing one example of an arrangement of a communication network system employing a communication control equipment 2 (2A to 2C) according to the present invention. Each of computers 1A to 1C is connected via each of communication control equipment 2 (2A to 2C) to a network 3.

Figure 3:
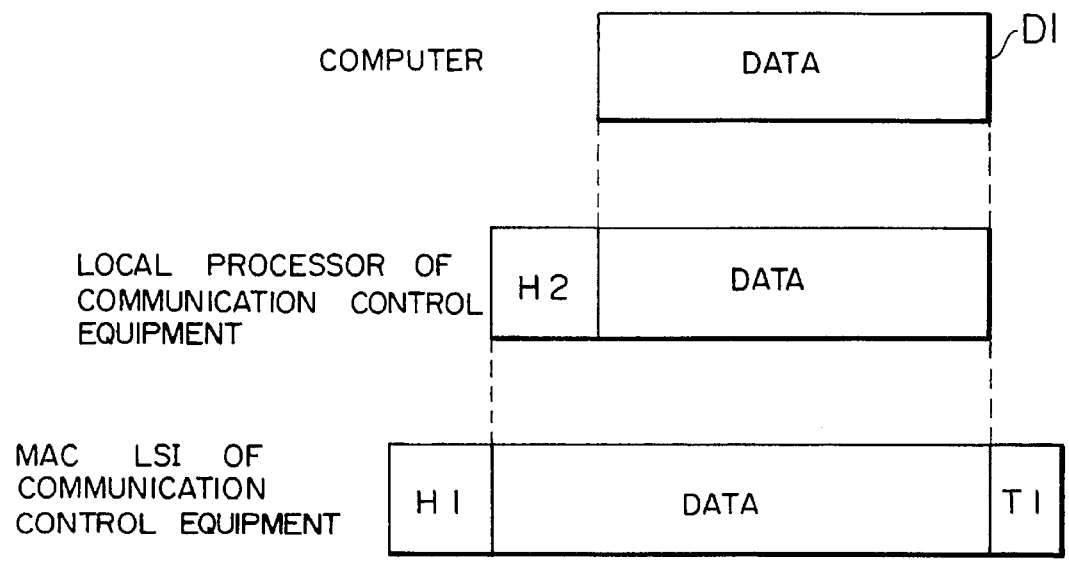
FIG. 3 illustrates one example of a packet format transmitted/received to/from the network.

FIG. 3 represents a relationship among transmission/reception data D1 handled by the computer 1, protocol headers H2, H1 attached to the communication control equipment 2, and a frame format (packet format) sent to the network 3. The protocol header H2 is attached by a local processor 70 (will be discussed later) of the communication control equipment 2, whereas the protocol header H1 is attached by an MAC.LSI 60 (will be described later) of the communication control equipment 2. In FIG. 3, symbol "T1" denotes a trailer.

Figure 1:
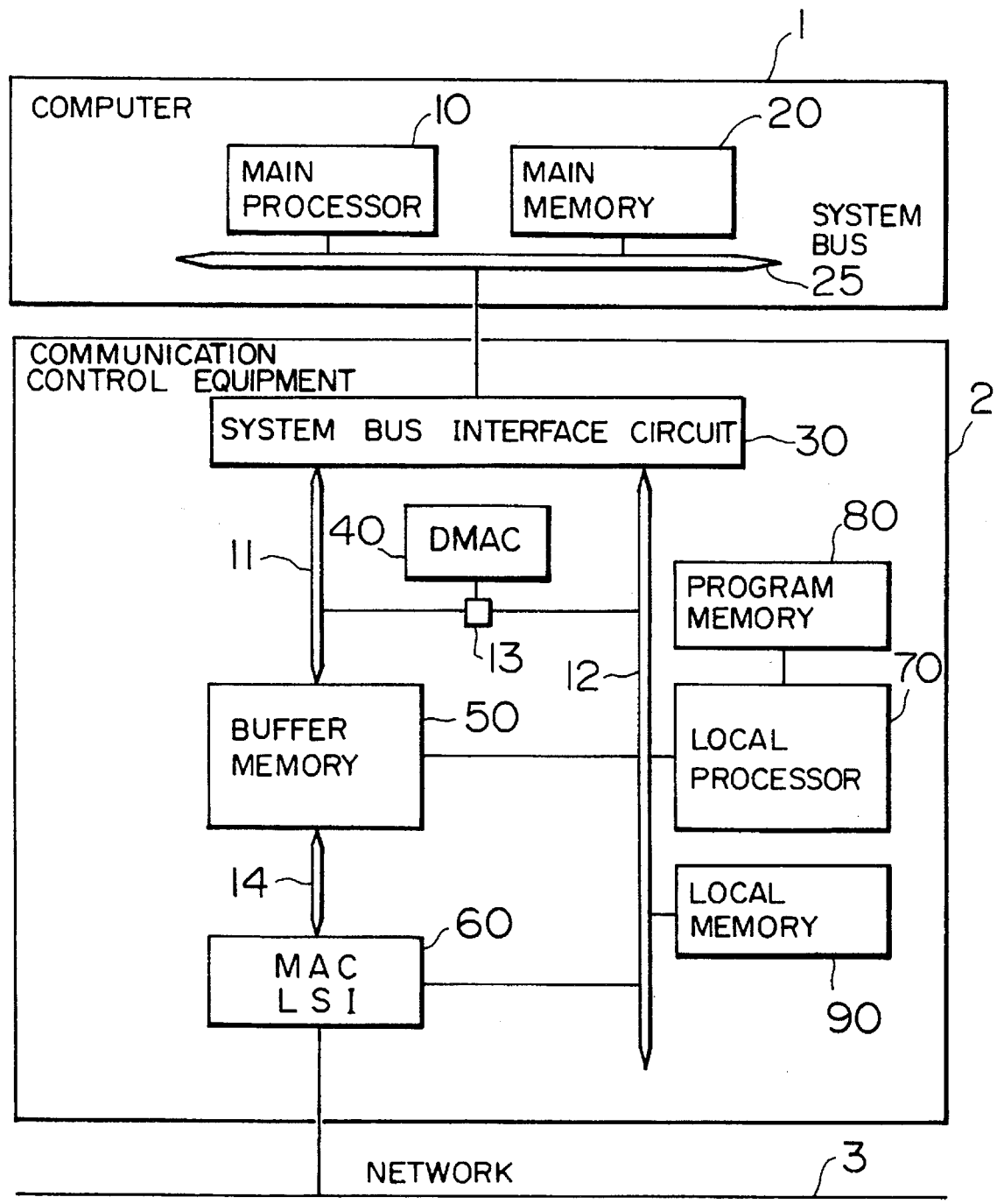
FIG. 1 is a schematic block diagram for representing one example of a communication control equipment according to the present invention.

FIG. 1 is a schematic block diagram for illustrating a connecting relationship between the computer 1 and one example of the arrangement of the communication control equipment 2. In FIG. 1, a main processor 10, a main memory 20, and the communication control equipment 2 which are employed within the computer 1, are connected to a system bus 25.

The communication control equipment 2 is arranged by a system bus interface circuit 30 to be connected to a system bus 25; a media access controller (will be referred to "MAC.LSI") 60, for controlling the data transmission/reception to the network 3; a buffer memory 50 for temporarily holding the transmission/reception data; and a local processor 70 for executing a communication protocol processing (namely, attachment of protocol header H2) with regard to the transmission/reception data stored in the buffer memory 50. The communication control equipment 2 is further constructed of a direct memory access controller (will be referred to "DMAC") 40 for executing a transfer of the transmission/reception data between the buffer memory 50 and the main memory 20 within the computer 1; a program memory 80 for storing an instruction (command) executed by the local processor 70, and a local memory 90 for defining a table and the like required to execute the protocol processing. It should be noted that the MAC.LSI 60 also executes the remaining communication protocol processing (attachment of protocol header H1).

The above-described communication control equipment 2 includes two internal bus systems. One internal bus system corresponds to a bus 11 and a bus 14 through which the transmission/reception data are transferred. The other internal bus system corresponds to a bus 12 used by the local processor 70 in order to execute the protocol processing. In this embodiment, as described above, since the internal bus is subdivided into the two bus systems, both of the transfer operation of the transmission data from the main memory 20 to the buffer memory 50, and also the protocol processing are carried out in a parallel mode. The buffer memory 50 constitutes a three-port memory and is so arranged that this buffer memory 50 can be simultaneously accessed by the DMAC 40, the MAC.LSI 60 and the local processor 70. The DMAC 40 and the MAC.LSI 60 are controlled by the local processor 70. The DMAC 40 is connected via a bus selecting circuit 13 to both of the bus 11 and 12. During the DMA transfer (data transfer) of the transmission data, the DMAC 40 is connected to the bus 11, whereas during the interface process with the local processor 70, the DMAC 40 is connected to the bus 12.

Figure 4:
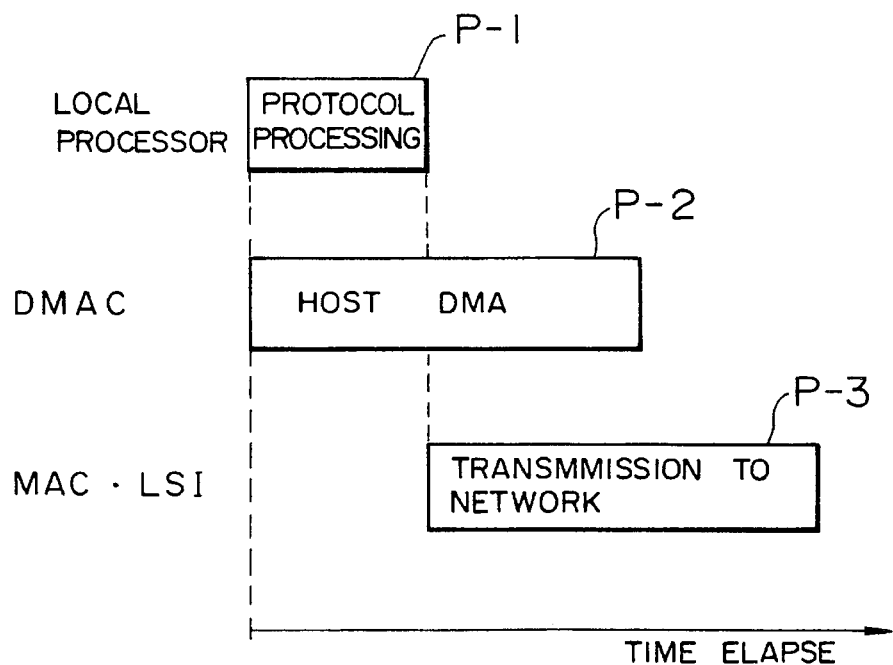
FIG. 4 represents example of a transmission operation realized by the present invention.

FIG. 4 is a time chart for showing one example of a basic operation for the data transfer method according to this preferred embodiment.

As represented in FIG. 4, in the data transfer method of this preferred embodiment, while the protocol processing P-1 is executed by the local processor 70, the data transfer from the main memory 20 to the buffer memory 50 (will be referred to a "host DMA") is carried out by the DMAC 40, and the data transmission P-3 from the buffer memory 50 to the network 3 is commenced before the host DMA has been completed in order to execute the data transmission process from the computer 1 to the network 3 at high speed.

Also, in this preferred embodiment, the communication control equipment is so arranged that the above-described operation can be realized, while an occurrence of an under-run is prevented as much as possible even when the host DMA speed is lower than the network transmission speed. Furthermore, according to this preferred embodiment, the communication control equipment is so arranged that the occurrence of the underrun can be reduced even under such an environment that the host DMA speed is dynamically changed in accordance with the load given to the system bus 25.

FIG. 5 represents one example of a relationship between the data transmission start timing to the network, the host DMA speed, and the network transmission speed in the data transmission of this preferred embodiment. As shown in FIG. 5, based upon a difference between the host DMA speed and the network transmission speed, the data transmission start timing to the network is determined, or controlled, so that the occurrence of the underrun can be reduced.

To achieve the above-descried operations, in accordance with this preferred embodiment, the following functions are given to the communication control equipment 2.

(a). A function to make an intermediate report of a DMA transfer at an arbitrary timing designated by the local processor 70, is given to the DMAC 40.

(b). To a program executed by the local processor 70, the following functions are given based upon the relationship between the host DMA speed and the network transfer speed; a function to calculate a transmission start timing to the network 3 at which an underrun never occurs (otherwise, may occur at a low probability) during the data transmission to the network 3; a function to give this start timing to the DMAC 40 as an occurrence timing of an intermediate report (transmission start instruction); and a function to initiate the MAC.LSI 60 while an completion of a protocol processing is synchronized with the intermediate report issued from the DMAC 40.

With reference to arrangements to realize these functions, a concrete explanation thereof will now be explained.

Figure 6:
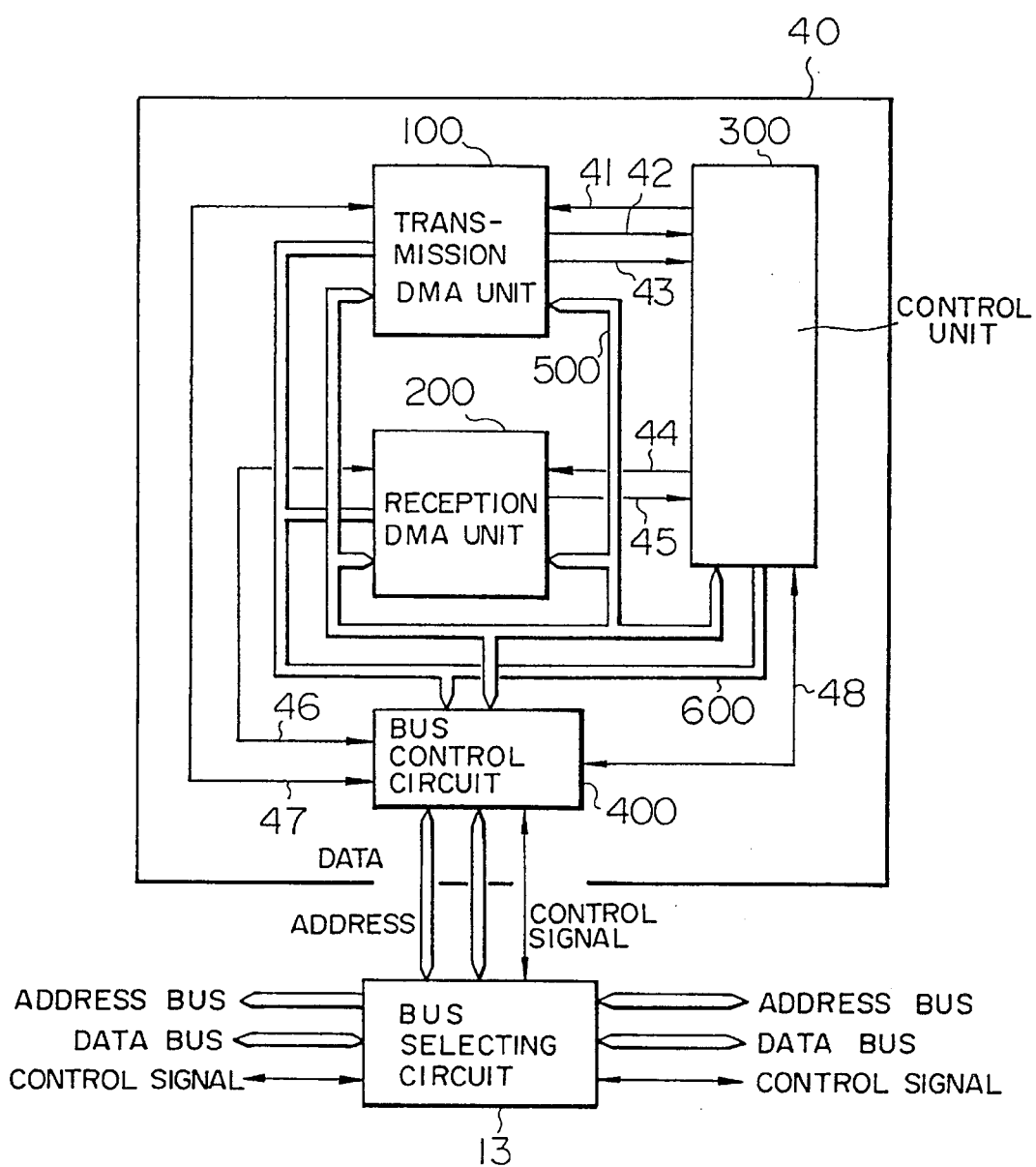
FIG. 6 indicates one example of an internal arrangement of DMAC.

FIG. 6 is a schematic block diagram for indicating an internal arrangement of the DMAC (direct memory access controller) 40 shown in FIG. 1.

The DMAC 40 is constructed of a transmission DMA unit 100 for executing a DMA transfer (data transfer) from the main memory 20 to the buffer memory 50; a reception DMA unit 200 for performing the DMA transfer from the buffer memory 50 to the main memory 20; a bus control circuit 400 for executing an access control to the bus 11 and the bus 12; and also a control unit 300 for controlling an overall operation of the DMAC 40. The control unit 300 accepts a DMA demand (namely, data transfer demand) via the bus control circuit 400 and the bus 48 from the local processor 70, and initiates either the transmission DMA unit 100, or the reception DMA unit 200 in response to a content of this instruction. Both of the transmission DMA unit 100 and the reception DMA unit 200 access the main memory 20 and the buffer memory 50 via the bus control circuit 400, thereby to execute the DMA transfer. In FIG. 6, reference numerals 500 and 600 denote buses.

Figure 7:
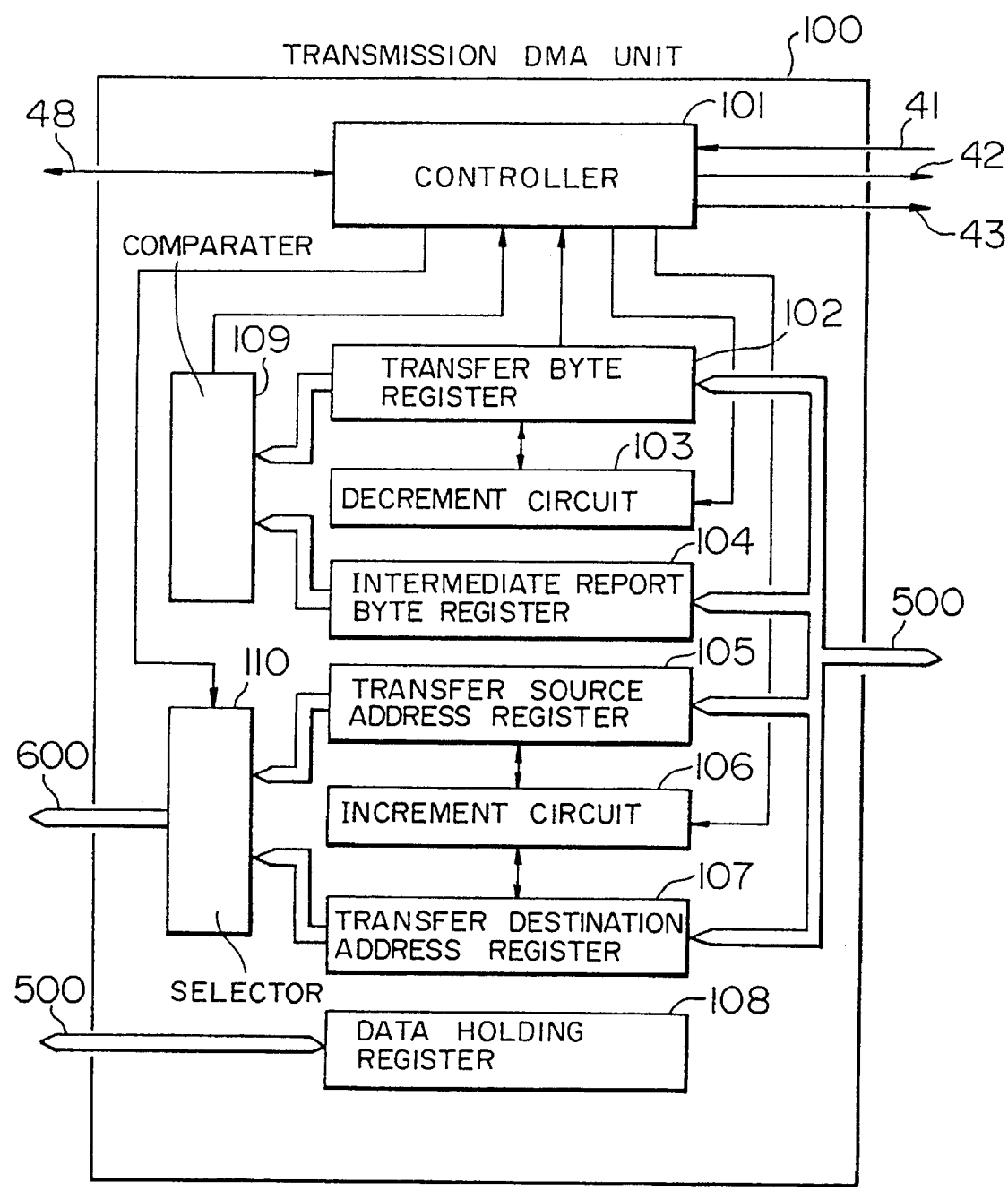
FIG. 7 shows one example of an internal arrangement of a transmission DMA unit.

FIG. 7 is a schematic block diagram for representing a detailed arrangement of the transmission DMA unit 100 shown in FIG. 6.

The transmission DMA unit 100 includes a transfer source address register 105 for holding a memory address (address of the main memory 20) of a transfer source; a transfer destination address register 107 for holding a memory address (address of the buffer memory 50) of a transfer destination; a transfer byte register 102 for holding a DMA transfer byte number (byte number of remaining data transfer, namely remaining data amount information); and a decrement circuit 103 for updating the transfer byte register 102. The transmission DMA unit 100 is further constructed of an increment circuit 106 for updating both of a transfer byte register 102 and the transfer destination address register 107; a selector 110 for selecting the transfer source address register 105 and the transfer destination address register 107 to give an access address to the bus control circuit 400; a data holding register 108 for temporarily holding data read out from the main memory 20; an intermediate report byte register 104 into which a value lower than the transfer byte number is set by the local processor 70; a comparator 109 for comparing the content (i.e., remaining data amount information) of the transfer byte register 102 with the content (i.e., reference data amount information) of the intermediate report byte register 104; and a controller 101 for executing an overall control operation of the transmission DMA unit 100.

The above-described transmission DMA unit 100 owns such a function to perform the DMA transfer between the memories designated by the local processor 70 and also to report to the local processor 70, such a fact that the remaining byte number of the DMA transfer (for instance, value obtained by subtracting the DMA passed (elapse) byte number from all byte numbers, i.e., a total DMA byte number, of the data for a 1 packet) has reached the byte number designated by the local processor 70. In other words, the comparator 109 detects that the value of the transfer byte register 102 becomes below than the value of the intermediate report byte register 104, and reports its detection signal (transmission start command) via the controller 101 and the control unit 300 to the local processor 70.

Figure 8:
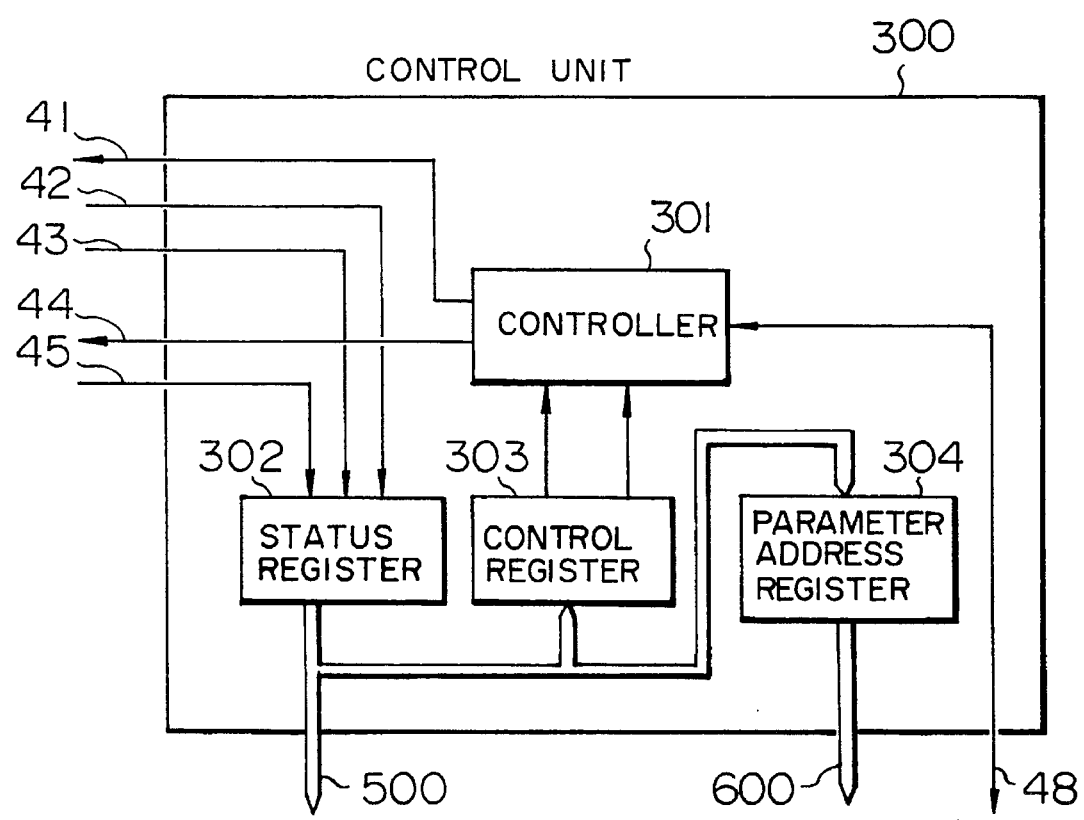
FIG. 8 indicates one example of an internal arrangement of a control unit.

FIG. 8 is a schematic block diagram for showing a detailed construction of the control unit 300 shown in FIG. 6.

The control unit 300 is so arranged by a control register 303 for accepting the DMA demand issued from the local processor 70; a status register 302 for performing a completion of the DMA and the above-described intermediate report (transmission start instruction); a parameter address register 304 for holding an address of a table into which a parameter of the transfer byte and the DMA address have been stored; and also a controller 301 for controlling these registers 302 to 304, transmission DMA unit 100 and reception DMA unit 200.

Figure 9:
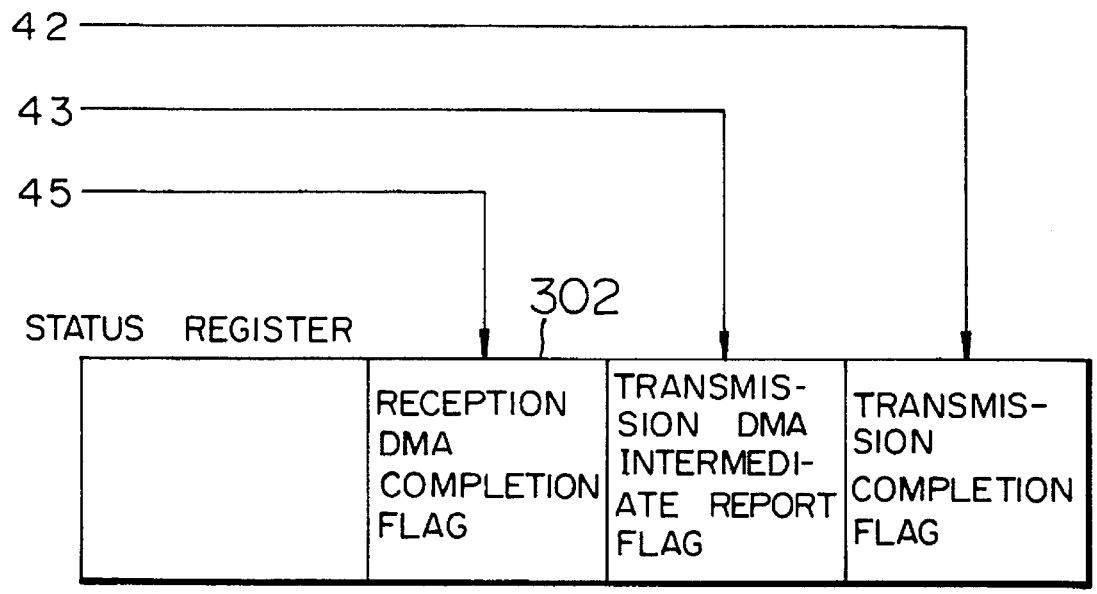
FIG. 9 shows one example of a bit arrangement of a status register.

FIG. 9 represents a bit arrangement of the status register 302 shown in FIG. 8. Into the status register 302, a transmission DMA completion report signal 42, the intermediate report signal (transmission start instruction) 43 issued from the transmission DMA unit 100, and a reception DMA completion report signal 45 announced from the reception DMA unit 200 are stored by the local processor 70 in a readable form.

Figure 10:
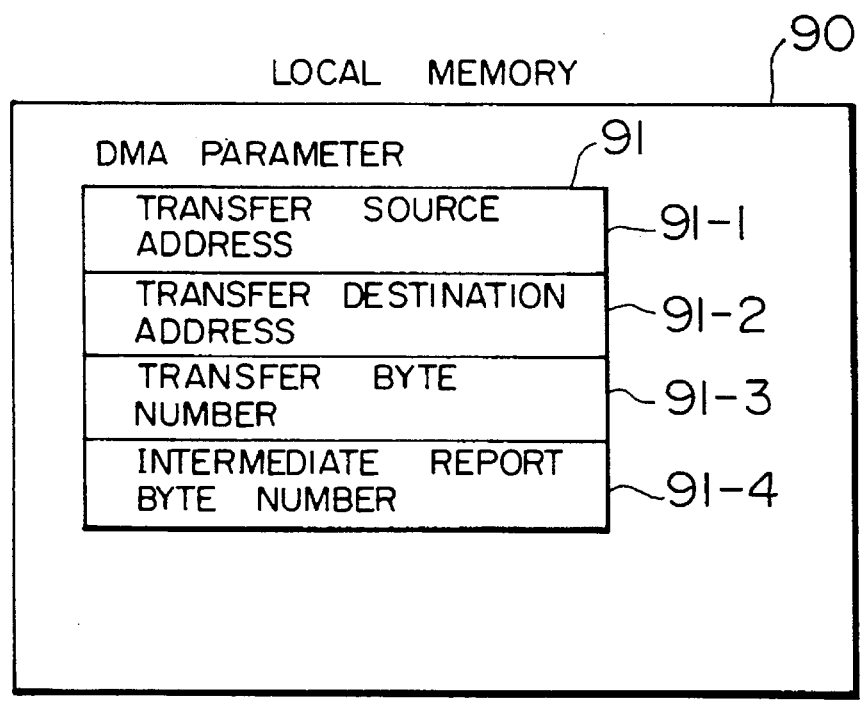
FIG. 10 represents one example of a format of a DMA parameter.

FIG. 10 shows a format of a DMA request command (will be referred to a "DMA parameter") 91 from the local processor 70 to the DMAC 40. The DMA parameter 91 is constructed of a transfer source address 91-1, a transfer destination address 91-2, a transfer byte number 91-3 and an intermediate report byte number 91-4, an is defined on the local memory 90 shown in FIG. 1.

Subsequently, an operation flow of the DMAC (direct memory access controller) 40 will now be explained.

Figure 11:
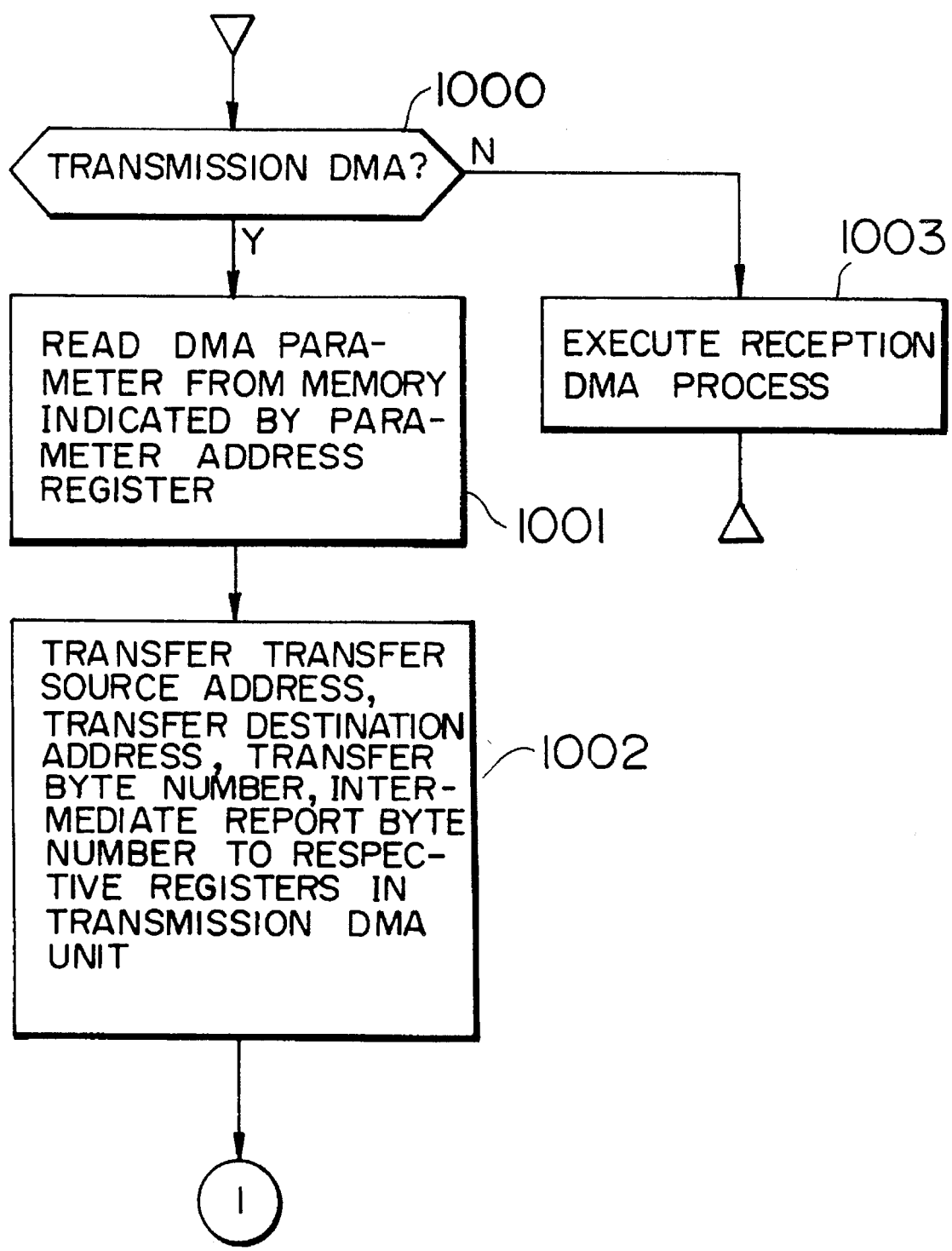
FIG. 11 is a flow chart for indicating one example of an operation of the DMAC.
Figure 12:
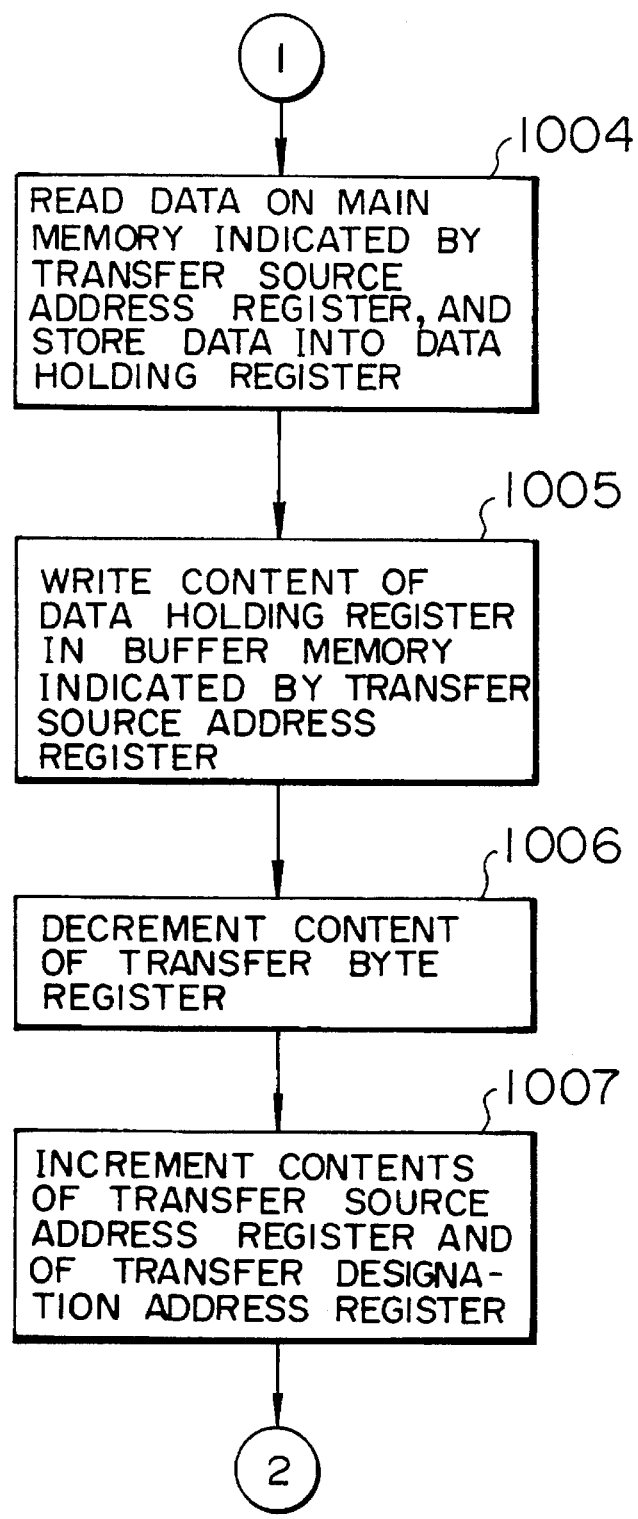
FIG. 12 is a flow chart for showing one example of an operation of the DMAC.
Figure 13:
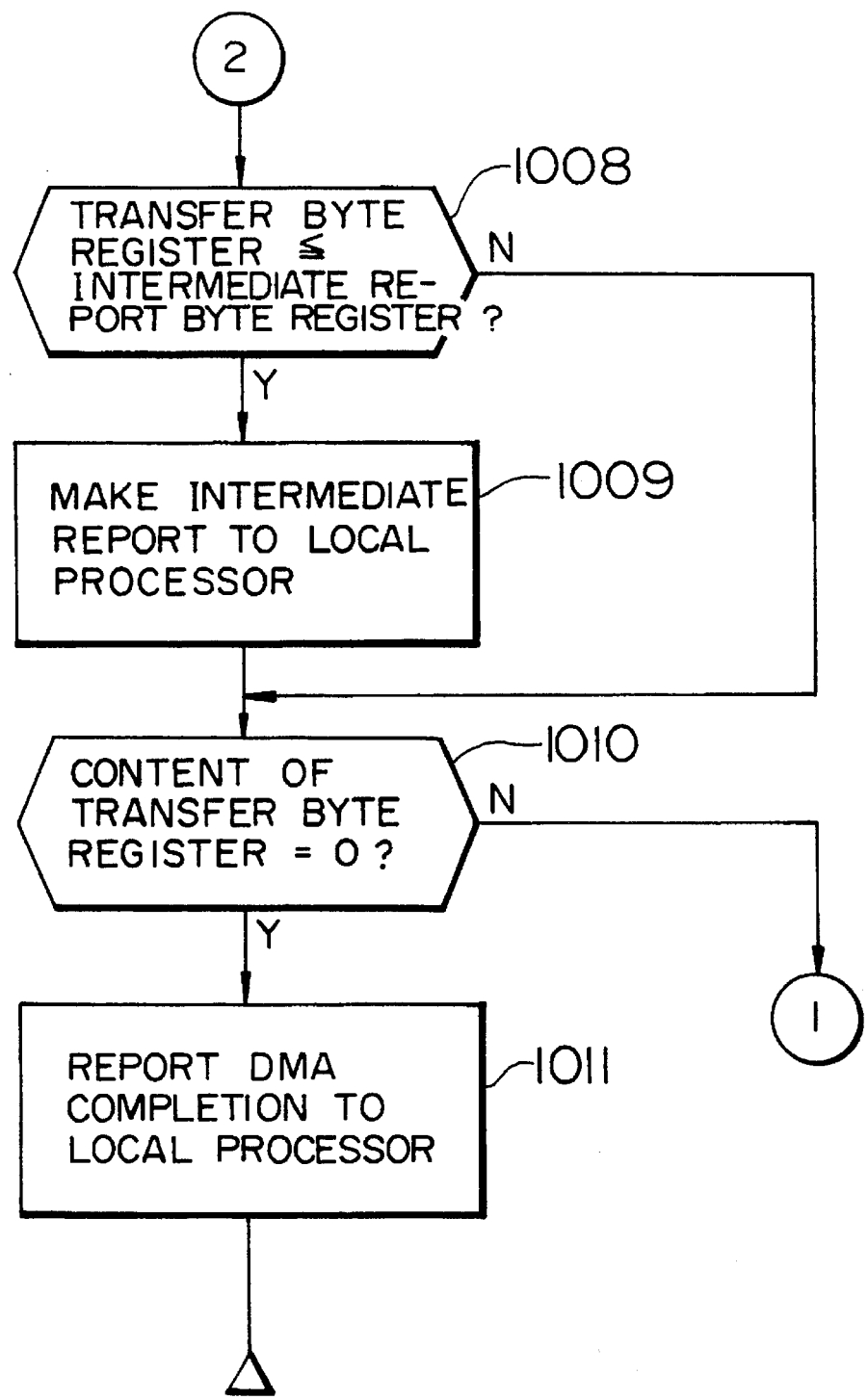
FIG. 13 is a flow chart for indicating one example of an operation of the DMAC.

FIGS. 11 to 13 are flow charts for showing an operation of the DMAC 40 when data is transmitted.

In FIG. 11, when the DMAC 40 judges that the transmission DMA request is accepted in accordance with the content of the control register 303 (step 1000), the DMA parameter 91 is read out from the memory indicated by the parameter address register 304 (step 1001). The transfer source address 91-1, the transfer destination address 91-2, the transfer byte number 91-3, and the intermediate report byte number 91-4 are transferred into the corresponding registers 105, 107, 102 and 104 within the transmission DMA unit 100, respectively (step 1002).

As represented in FIG. 12, in the transmission DMA unit 100, the data stored in the main memory 20, which is indicated by the transfer source address register 105, is read and thereafter stored in the data storage register 108 (step 1004). Subsequently, the content of the data storage register 108 is written into the buffer memory 50 indicated by the transfer destination address register 107 (step 1005). Thereafter, the content of the transfer byte register 102 is decremented (step 1006), and also the contents of the transfer source address register 105 and the transfer destination address register 107 are incremented (step 1007).

Next, as indicated in FIG. 13, a comparison is done between the value of the transfer byte register 102 and the value of the intermediate report byte register 104. If the value of the transfer byte register 102 is smaller than, or equal to the value of the intermediate report byte register 104, then the intermediate report (transmission start instruction) is made via the status register 302 to the local processor 70 (step 1009). Then, a judgement is made of the content of the transfer byte register 102 (step 1010). If the content of the transfer byte register 102 reaches "0", then the DMA completion report is carried out to the local processor 70 (step 1011). If the DMA transfer operation has not yet been completed, the operation flows as defined in FIGS. 12 and 13 are repeated.

Subsequently, the operations of the local processor 70 will now be explained.

Figure 14:
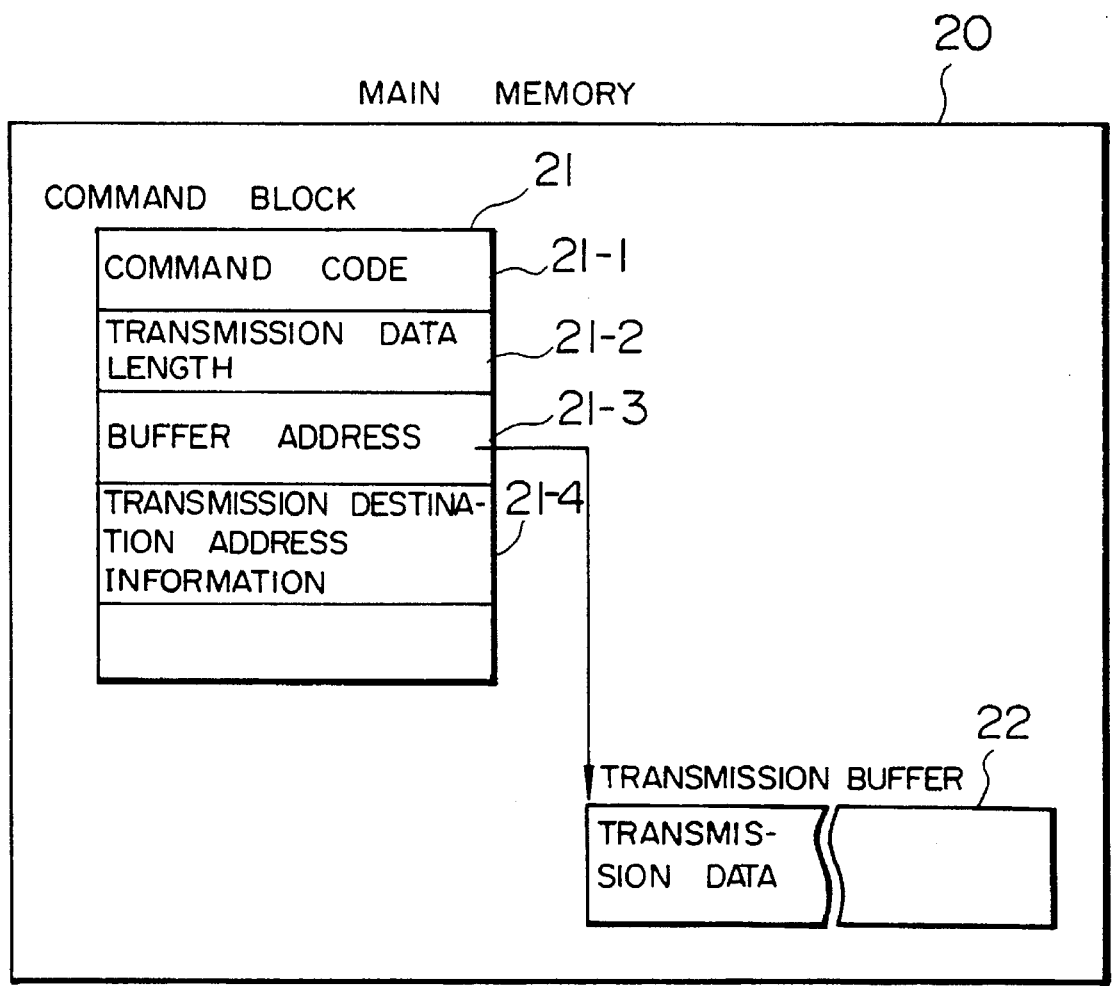
FIG. 14 represents one example of a format for a command issued by a computer.

FIG. 14 represents one example of a format of a transmission request command issued from the computer 1 to the communication control equipment 2.

The transmission request issued from the computer 1 to the communication Control equipment 2 is made with employment of a command block defined on the main memory 20. To the command block 21, a command code indicative of the request content, a transmission data length (namely, all data amount of 1 packet. Note that a length of 1 packet may fixed or variable), a transmission buffer address 21-3 to which the transmission data has been stored, and computer address information 21-4 of data destination are set.

Figure 15:
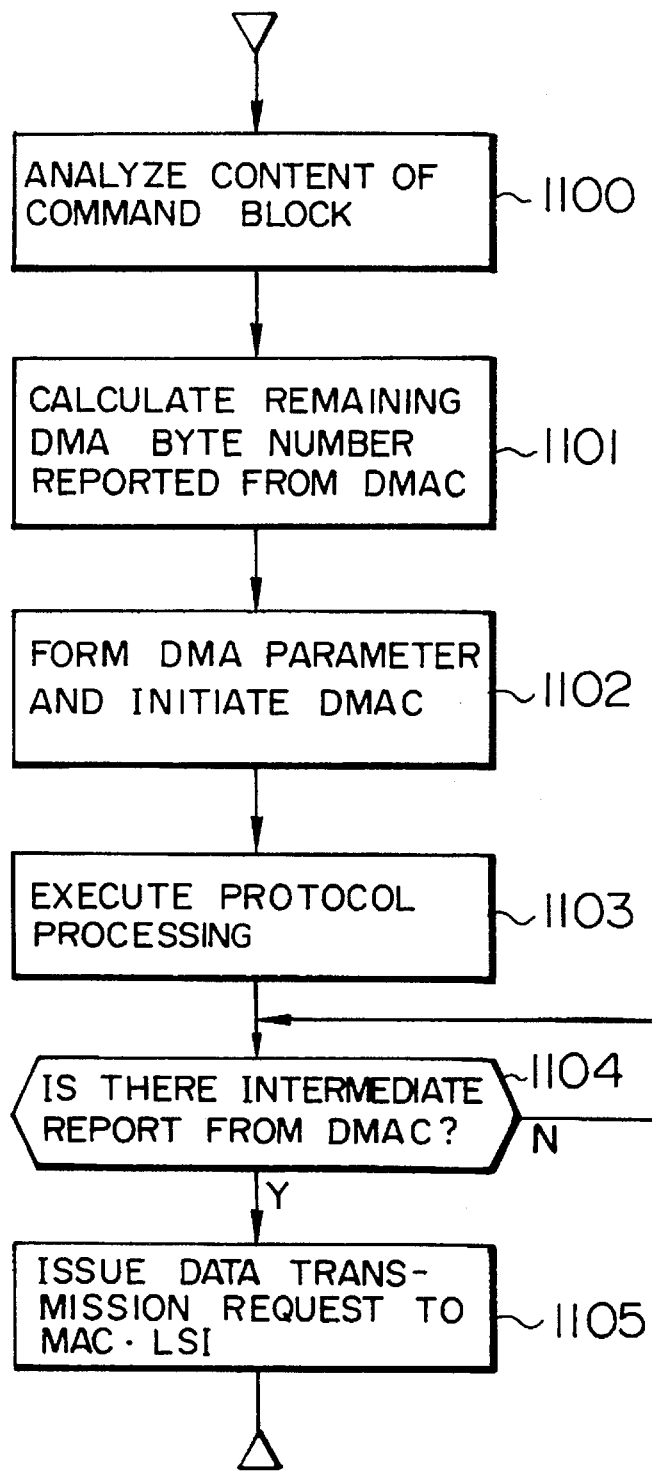
FIG. 15 is a flow chart for denoting one example of an operation of a local processor.

FIG. 15 is a flow chart for showing an operation of the local processor 70 during a data transmission. Upon receipt of the data transmission request from the computer 1, the command block 21 on the main memory 20 is read and analyzed by the local processor 70 (step 1100). Next, the remaining DMA byte number is calculated which represents a timing at which the intermediate report is wanted from the DMAC 40 to the host DMA, namely a timing at which an underrun does not occur (otherwise, occurs at a low probability) when the data is transmitted to the network 3 (step 1101). In other words, at the step 1101, the remaining DMA byte number (reference data amount information) is obtained which determines a start time instant (e.g., see FIG. 5) within a range defined from a time instant when the 1-paket data transfer from the main memory 20 to the buffer memory 50 is commenced until a time instant when this data transfer is accomplished, under such a condition that the later the data transfer speed from the main memory 20 to the buffer memory 50 is relatively with respect to the transmission speed of the network 3, the later the start instant is. In a concrete example, this remaining DMA byte number is determined as a value smaller than or equal to a length of transmission data, and also is determined under such a condition that the later the data transfer speed from the main memory 20 to the buffer memory 50 is relatively with respect to the transmission speed of the network 3, the less the remaining DMA byte number is. Thereafter, based upon the result of the process 1101, the DMA parameter 91 is produced to initiate the DMAC 40 (step 1102).

The initiation of this DMAC 40 is carried out by setting the address of the DMA parameter 91 into the parameter address register 304, and setting the transmission DMA request command to the control register 303. Subsequently, the protocol processing (attachment of protocol header H2) is executed (step 1103). It should be noted that this protocol processing includes processes as defined in steps 1103', 1107 and 1108 of a flow chart shown in FIG. 20 (will be described later). When this protocol processing is accomplished, the intermediate report from the DMAC 40 is waited (step 1104). When the intermediate report is issued from the DMAC 40, a date transmission request is made to the MAC.LSI 60 (step 1105).

In the above-described preferred embodiment, the remaining DMA byte number (namely, amount of data among 1 packet data, which has not yet been transferred to the buffer memory 50) is designated as the reference value with regard to the data transmission start timing (namely, issuing time instant for transmission start instant) to the network 3. Alternatively, the DMA passed byte number may be designated as the reference value. The DMA passed byte number corresponds to an amount of data among 1 packet data, which has been transferred to the memory 50. In case that the DMA passed byte number is designated, for instance, at a step 1101 of FIG. 15, this DMA passed byte number is determined as a value smaller than or equal to a length of transmission data, and also is determined under such a condition that the later the data transfer speed from the main memory 20 to the buffer memory 50 is relatively with respect to the transmission speed of the network 3, the greater the DMA passed byte number is.

In accordance with this preferred embodiment, as previously described, since the transmission start instruction is produced within the range defined from the timing at which the 1-packet data transfer operation from the main memory 20 to the buffer memory 50 is commenced, until the timing at which this 1-packet data transfer operation is completed, the data transmission to the network 3 is commenced before the 1-packet data transfer operation from the main memory 20 to the buffer memory 50 has been completed. Accordingly, the data transmission delay time can be reduced even for the network 3 through which the data can be transferred within one time, the maximum data length thereof being long. As a consequence, the data can be transmitted to the network 3 at high speed. Also, according to the present embodiment, since the intermediate report (namely, transmission start instruction) is issued in the range defined from the timing at which the 1-packet data transmission from the main memory 20 to the buffer memory 50 is commenced, until the timing at which this 1-packet data transmission is ended, the occurrence of the underrun can be prevented as much as possible. Alternatively, according to the present invention, the timing at which the transmission start instruction is issued may be determined based upon the elapse of time since the 1-packet data transfer operation has started from the main memory 20 to the buffer memory 50. However, in this case, an underrun readily happens to occur under such an environment that the host DMA speed is dynamically changed due to the load variations of the system bus 25. With respect to this point, in accordance with this preferred embodiment, as the timing for issuing the transmission start instruction is determined based upon not the elapse of time, but the remaining DMA byte number, such an occurrence of underrun can be prevented as much as possible even under such an environment that the host DMA speed is dynamically varied due to the load conditions of the system bus 25. Furthermore, there is another advantage that since the occupied time of the transmission buffer may be shortened while reducing the data transmission delay time, the transmission buffer can be effectively utilized.

However, even in accordance with this preferred embodiment, an underrun may happen to occur in a specific case. That is to say, the underrun may occur under such an environment that the host DMA speed is suddenly changed during the host DMA transfer operation due to the load variations of the system bus 25. As a consequence, in accordance with a preferred embodiment 2 (will be explained later), even when such an underrun happens to occur, measurements are taken to such a specific environment in order not to cause a trouble in the data transmission to the network 3.

(Preferred Embodiment 2)

A different point of this preferred embodiment 2 from the above-described preferred embodiment 1 exists in an arrangement of the buffer memory 50 and a function of the local processor 70.

Figure 16:
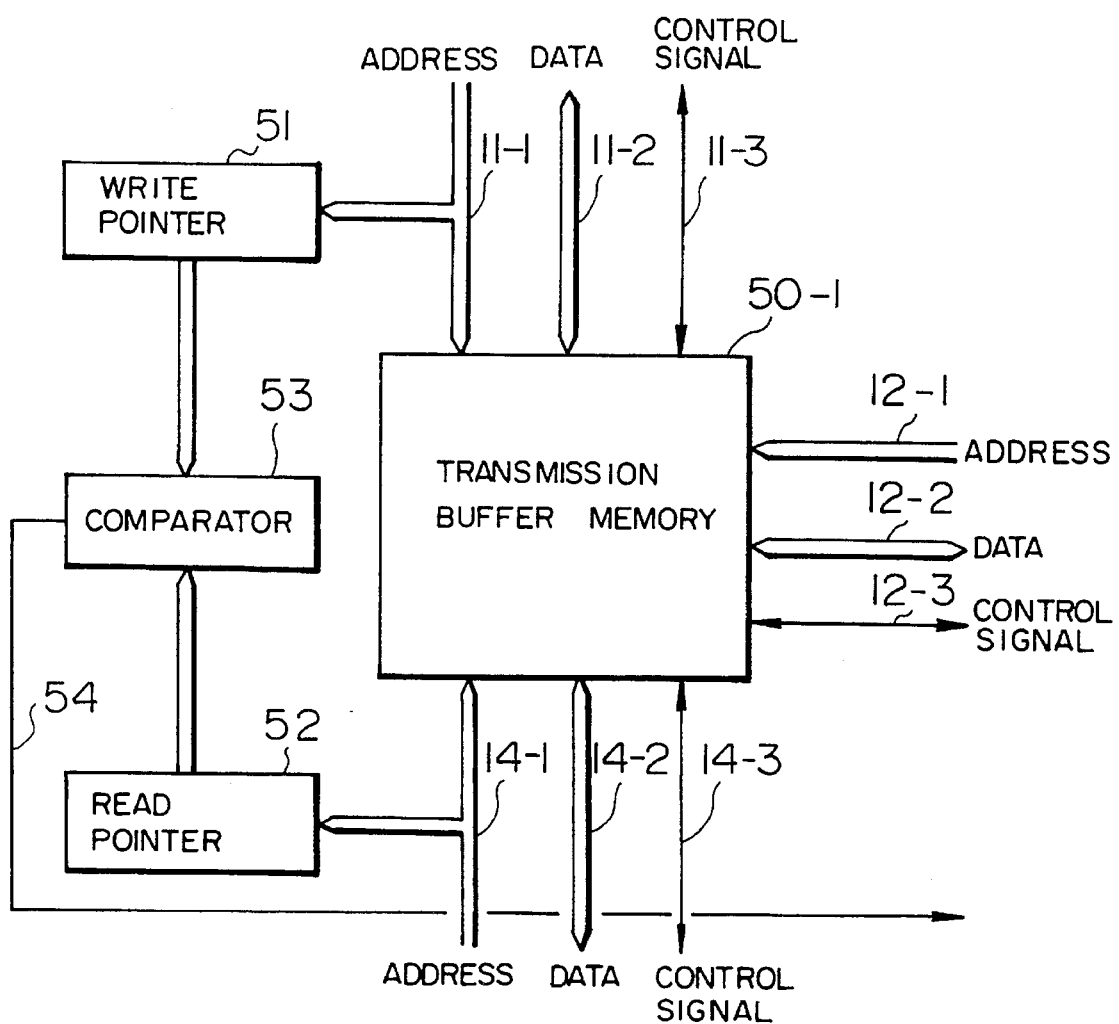
FIG. 16 shows one example of an arrangement of a transmission buffer memory.

FIG. 16 represents the arrangement of the buffer memory 50 capable of detecting an occurrent of an underrun during a data transmission. It should be noted that the transmission buffer shown in FIG. 16. is limited to such a transmission buffer used in a data transmission.

In FIG. 16, to a transmission buffer memory 50-1, there are provided a write pointer 51 for holding a write address outputted from the DMAC 40, a read pointer 52 for holding a read address outputted from the MAC.LSI 60, and a comparator 53 for comparing the content of the write pointer 51 with the content of the read pointer 52. When the content of the read pointer 52 is greater than that of the write pointer 51, the comparator 53 outputs an underrun detecting signal 54 and issues a report via the bus 12 to the local processor 70. In other words, in case that data is transmitted to a memory address at which the transmission data is not written, this underrun detecting signal 54 is derived from the comparator 53 and supplied via the bus 2 to the local processor 70.

Upon receipt of the underrun detecting signal 54 via the bus 12, the local processor 70 interrupts the data transmission operation, and retransmits data of a packet in which the underrun happens to occur. It should be noted that the transmission buffer 50-1 may be constructed of a FIFO as another method for detecting the occurrence of the underrun, since a FIFO has such functions of the write pointer 51, the read pointer 52 and the comparator 53.

In accordance with this preferred embodiment, when the underrun happens to occur, the recovery process is carried out. As a consequence, even if such an underrun happens to occur, there is no problem in the data transmission to the network 3.

(Preferred Embodiment 3)

In the above-described preferred embodiments 1 and 2, it takes a lengthy time until the DMAC 40 is initiated since the remaining DMA byte number indicative of the data transmission start timing to the network 3 is calculated every time the data transmission is carried out. To the contrary, in the below-mentioned preferred embodiment 3, the remaining DMA byte number is calculated within the DMAC 40, so that the DMAC 40 can be quickly initiated by the local processor 70, and therefore the data transmission can be performed at higher speed than that of the preferred embodiments 1 and 2.

Figure 17:
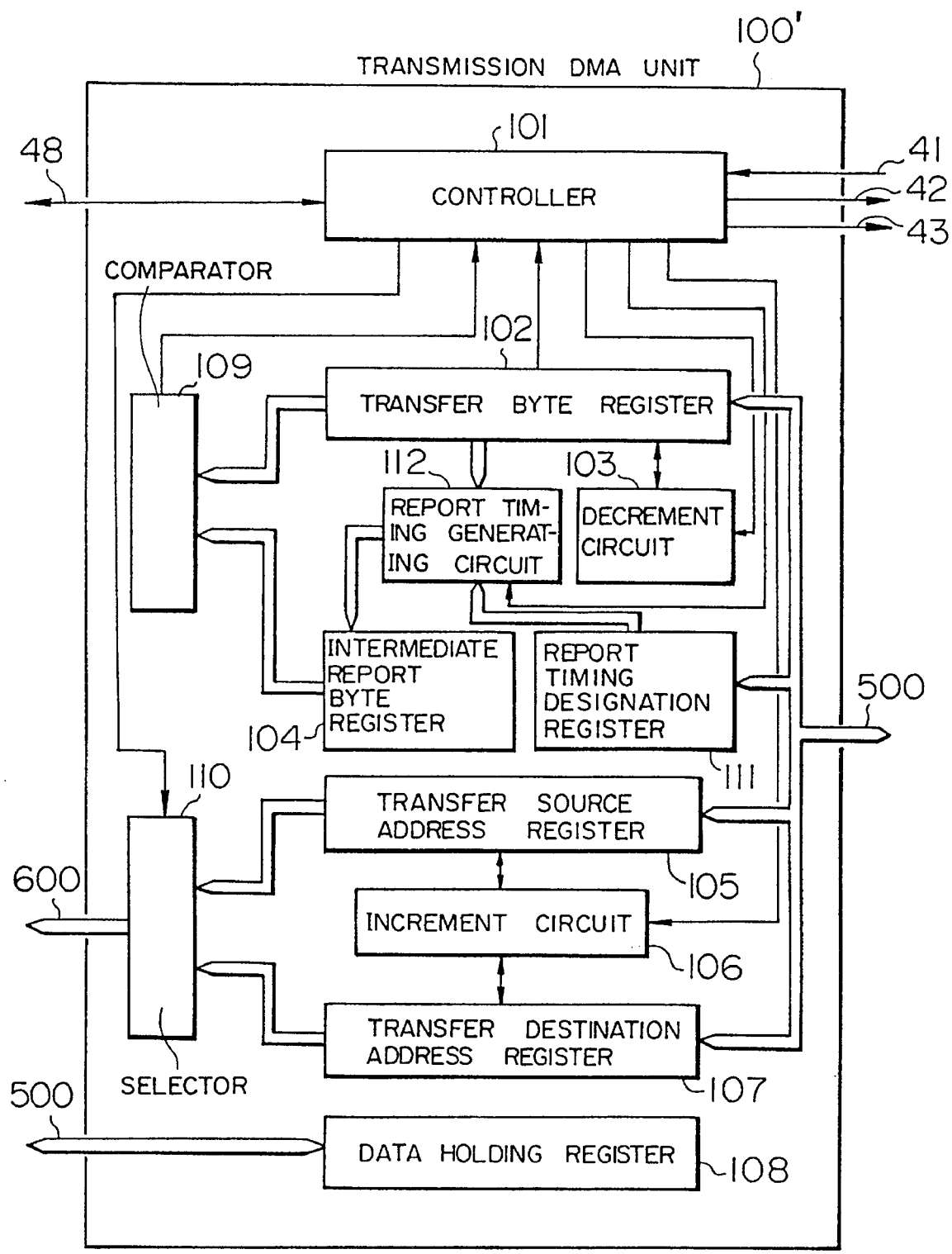
FIG. 17 indicates another example of the arrangement of the transmission DMA unit.

FIG. 17 is a schematic block diagram for representing one example of an arrangement of a transmission DMA unit 100' equipped with such a function. The transmission DMA unit 100' is so constructed that both of a report timing designation register 111 and a report timing generating circuit 112 are added to the above-described transmission DMA unit 100 shown in FIG. 7.

The report timing designation register 111 is a register settable by the local processor 70, and holds data (reference ratio information) indicative of a ratio of a remaining DMA byte number (namely, remaining data amount) for performing an intermediate report (transmission start instruction) to a total DMA byte number (all data amount). For instance, when "80" is set to the report timing designation register 111, this implies that the intermediate report is issued at a time instant when the remaining DMA byte number reaches 80% of the overall DMA byte number, namely when 20% of the host DMA transfer operation has been completed. The value set into the report timing designation register 111 is such a value which can be determined by a difference between a host DMA speed and a network transfer speed, not by the length of the transmission data. This value is set during only the initial setting operation of the DMAC 40. The report timing generating circuit 112 calculates the remaining DMA byte number used for performing the intermediate report based upon both of the content of the transfer byte register 102 and the content of the report timing designation register 111 in response to an instruction issued from the controller 101. Also, the report timing generation circuit 112 has a function to store the calculation result into the intermediate report byte register 104. It should be noted that the report timing designation register 111 may hold data representative of a ratio of a DMA passed byte number used for performing the intermediate report to the overall DMA byte number. In this case, the report timing generating circuit 112 calculates the passed byte number used for executing the intermediate report.

Figure 18:
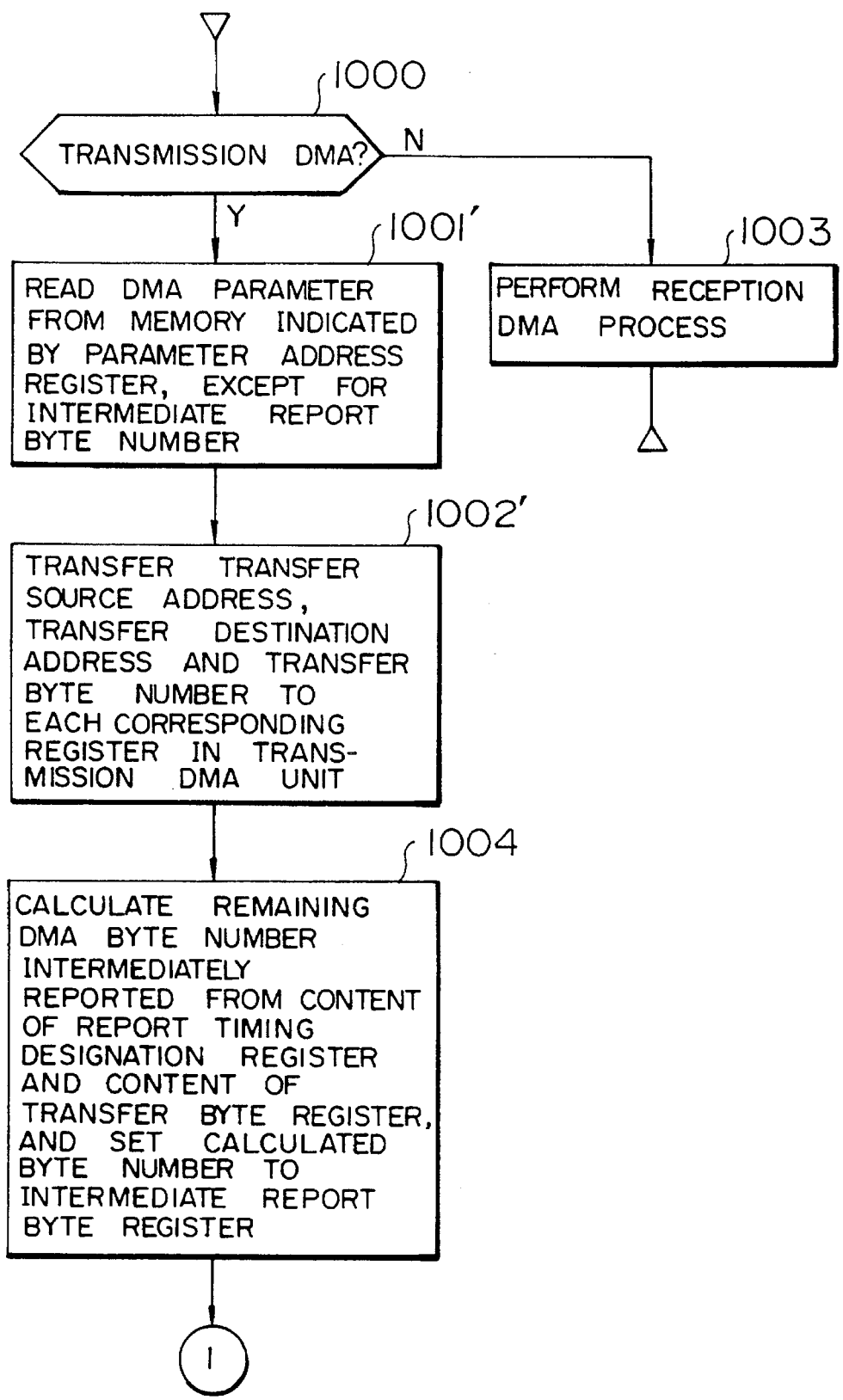
FIG. 18 is a flow chart for representing another example of the operation of the DMAC.

FIG. 18 is a flow chart for explaining an operation of the DMAC (direct memory access controller) 40 including the transmission DMA unit 100'.

Upon receipt of the transmission DMA request issued from the local processor 70, the DMA parameter 91 except for the intermediate report byte number is read out from the memory indicated by the parameter address register 304, is read (step 1001'), and then is transferred to the corresponding register employed in the transmission DMA unit 100' (step 1002'). Next, the remaining DMA byte number is calculated based upon the content of the report timing designation register 111 and the content of the transfer byte register 102, and the calculation result is set into the intermediate report byte register 104 (step 1004). Subsequently, the DMA transfer operation is carried out in accordance with the operation flows shown in FIGS. 12 and 13 in a manner similar to that of the preferred embodiment 1.

Figure 19:
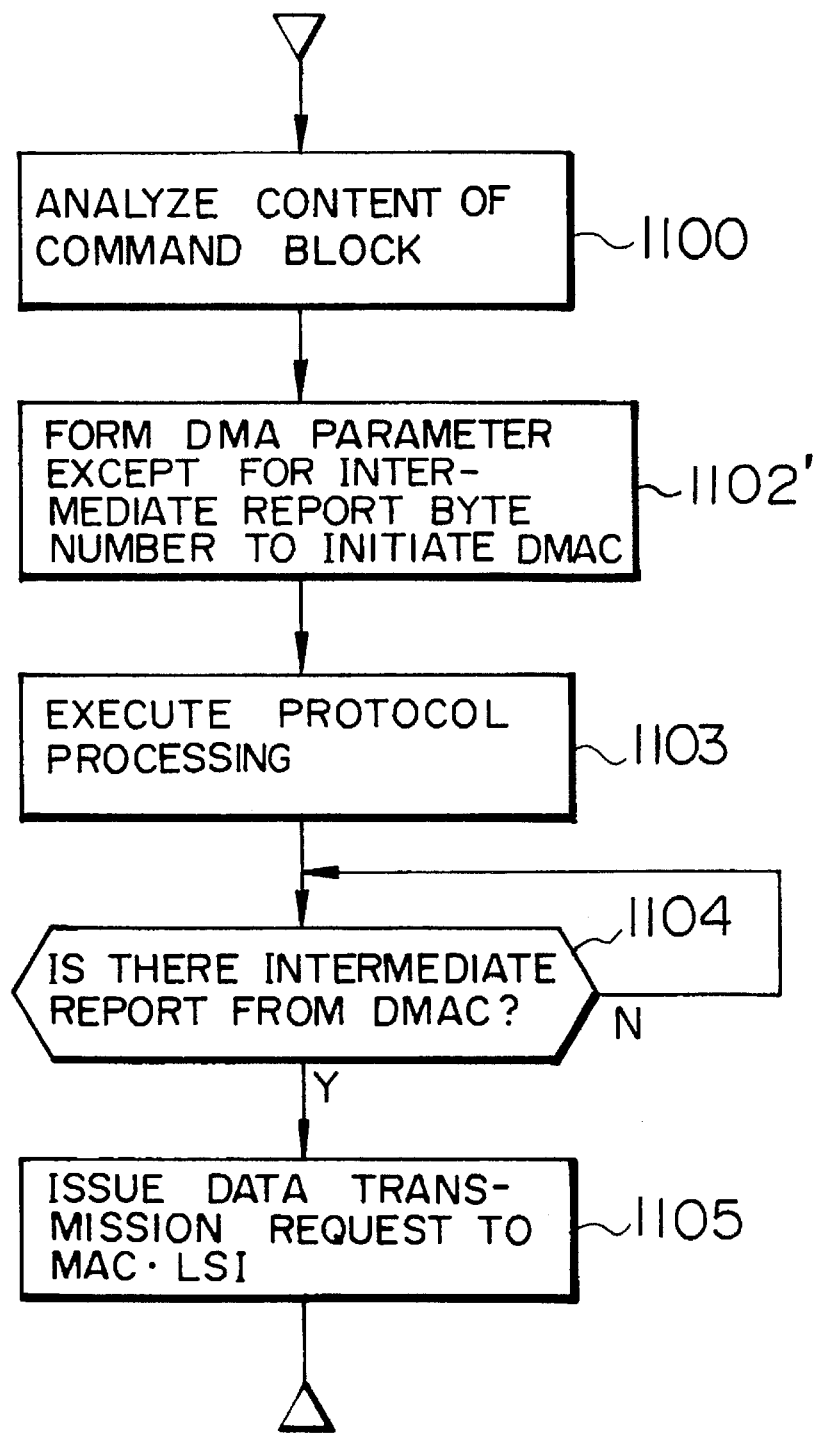
FIG. 19 is a flow chart for indicating another example of the operation of the local processor.

FIG. 19 is a flow chart for explaining an operation of the local processor 70 in case that the DMAC 40 including the above-described transmission DMA unit 100' is used.

After the local processor 70 has analyzed the content of the command block 21 issued from the computer 1 (step 1100), this local processor 70 forms the DMa parameter 91 except for the intermediate report byte number and initiates the DMAC 40 (step 1102'). Next, the protocol processing is carried out (step 1103) in a similar manner to that of the preferred embodiment 1, and the data transmission request is issued to the MAC.LSI 60 (step 1105) in synchronism with the intermediate report from the DMAC 40 (1104).

According to this preferred embodiment, since the remaining DMA byte number for indicating such a timing at which the intermediate report is accepted from the DMAC 40, is no longer calculated by the local processor 70, the DMAC 40 can be quickly initiated. As a consequence, there is a merit that the data transmission can be performed at higher speed that that of the previous data transmission.

(Preferred Embodiment 4)

When the methods as described in the previous embodiments 1 to 3 are executed, since the occupied time of the transmission buffer can be shortened, the transmission buffer can be effectively utilized. However, in accordance with the operation flow of the local processor 70 shown in FIGS. 15 and 19, the host DMA transfer operation is commenced before the execution of the protocol processing. As a result of the execution of the protocol processing, the transmission waiting process occurs and the data transfer operation to the transmission buffer occurs also for the data which is stopped to be transmitted to the network 3. As a result, since the transfer buffer is occupied until such a transmission pending condition is released, a small improvement is needed in the utilization of the transfer buffer.

In the preferred embodiment 4, only when the data transmission to the network 3 is available, the transmission data is transferred to the buffer memory 50, so that the utilization of the transmission buffer can be increased.

Figure 20:
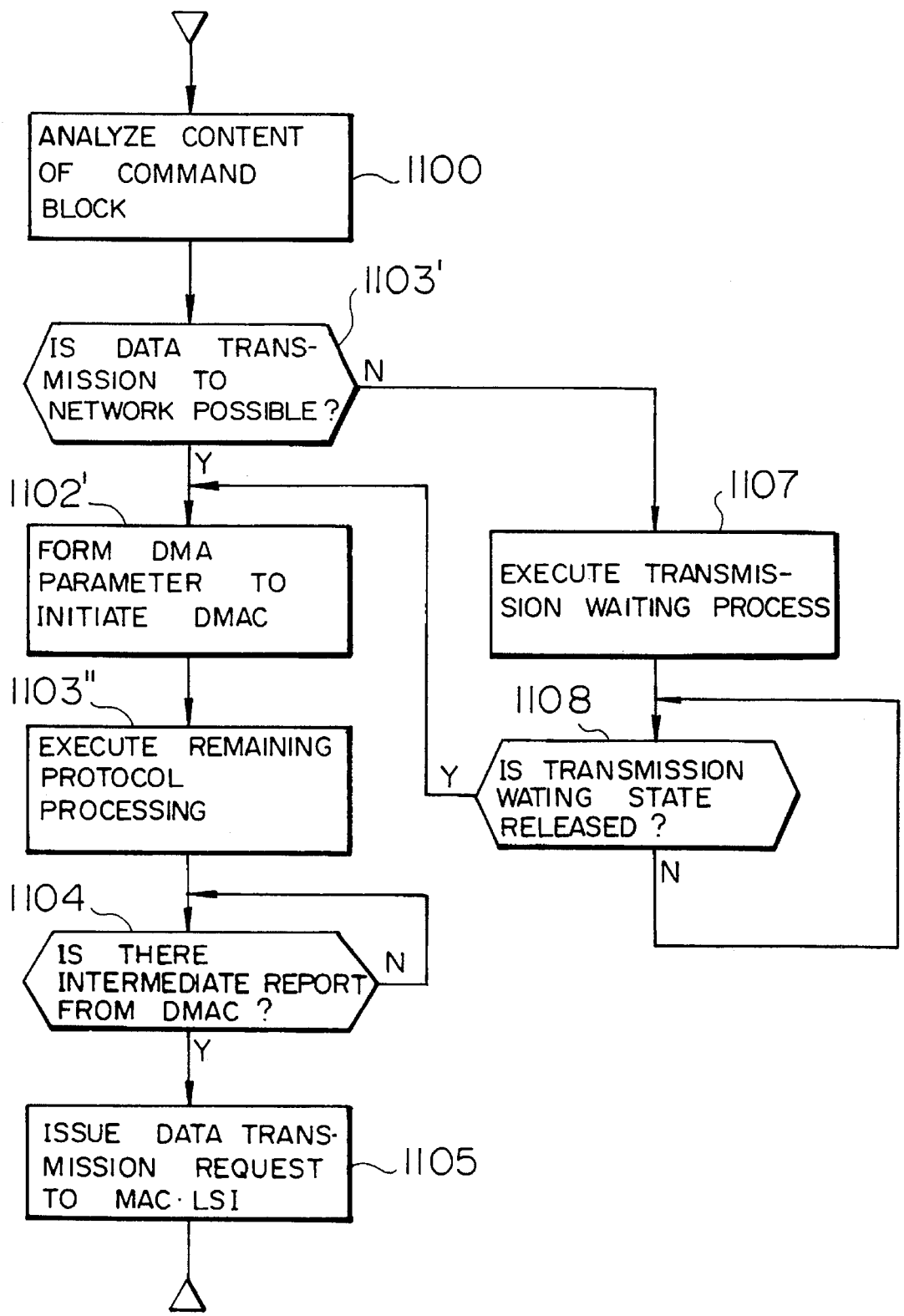
FIG. 20 is a flow chart for showing a further example of the operation of the local processor.

FIG. 20 is a flow chart for representing an operation of the local processor 70 in this preferred embodiment. Upon receipt of the data transfer request from the computer 1 (step 1100), the local processor 70 judges, as a preprocess for the protocol processing, whether or not the data transmission to the network is possible (step 1103'). If possible item the DMAC 40 is initiated (step 1102') and then the remaining protocol processing is carried out (step 1103'). In other words, at a step 1107, the processes are carried out in which the processes at the steps 1103', 1107 and 1108 of FIG. 20 are excluded from the processes at this step 1103. To the contrary, in such a case that the data transmission is not possible, the transmission waiting process is carried out (step 1107), and this pending condition is maintained until the data transmission is available (step 1108). When the data transmission is available, the DMAC 40 is initiated (step 1102') and the remaining protocol processing is performed (step 1103"). Upon completion of the protocol processing, the data transmission demand is issued to the MAC.LSI 60 in synchronism with the intermediate report from the DMAC 40.

Figure 21:
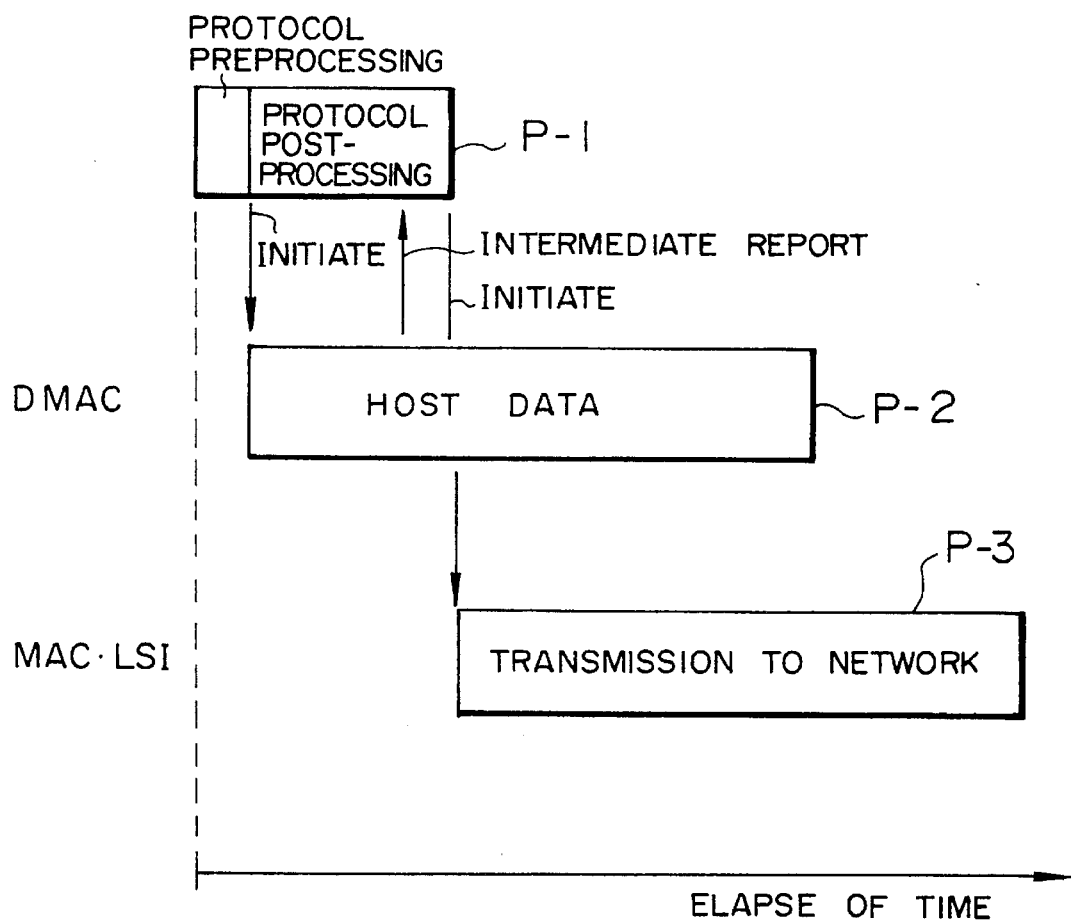
FIG. 21 is a time chart for representing another example of the operation of the communication control equipment.

FIG. 21 is a flow chart for representing an operation of the communication control equipment 2 in case that the operation flow shown in FIG. 20 is executed by the local processor 70.

According to this preferred embodiment, since the transmission data is transferred to the buffer memory 50 only when the data transmission to the network 3 is available, the utilization of the transmission buffer can be furthermore improved, as compared with those of other preferred embodiments.

It should be noted that in the respective preferred embodiments, the DMAC 40 corresponding to the data transfer equipment with the function to execute the above-described intermediate report, is employed in the communication control equipment. However, the DMAC 40 having such a function capable of reporting the data transfer condition may be applied to many other apparatuses under such a case that data stored in a certain memory space is transferred to another memory space.

We claim:

1. A communication control equipment for transmitting data in an external predetermined memory to a network, comprising:

buffer memory means for temporarily holding data transferred thereto;

data transfer means for transferring data between said predetermined memory and said buffer memory means;

means for executing a protocol processing with regard to said data held in said buffer memory means;

control means for controlling a transmission of said data processed by said protocol processing to said network;

means for producing a transmission start instruction at a start time instant within a range from a time instant when transfer of one packet of data from said predetermined memory to said buffer memory means is commenced until a time instant when said one packet of data transfer is accomplished, wherein the lower a data transfer speed from said predetermined memory to said buffer memory means is relative to a transmission speed of said network, the later said start time instant is set; and means for causing said control means to commence transmission of said data processed by said protocol processing to said network at a time instant in between a time instant when said transmission start instruction is produced and a time instant when said protocol processing is terminated;

wherein said transmission start instruction producing means comprises:

means for receiving data amount information indicative of an amount of data included in said one packet of data, means for obtaining remaining data amount information indicative of an amount of data of said one packet of data which has not yet been transferred to said buffer memory means, means for obtaining reference data amount information indicative of a reference amount of data less than or equal to said amount of data included in said one packet of data, wherein the lower said data transfer speed from said predetermined memory to said buffer memory means is relative to said transmission speed of said network, the less said reference data amount information is, and means for comparing said remaining data amount information with said reference data amount information and for producing said transmission start instruction when said remaining data amount information is less than or equal to said reference data amount information.

2. A communication control equipment for transmitting data in an external predetermined memory to a network, comprising:

buffer memory means for temporarily holding data transferred thereto;

data transfer means for transferring data between said predetermined memory and said buffer memory means;

means for executing a protocol processing with regard to said data held in said buffer memory means;

control means for controlling a transmission of said data processed by said protocol processing to said network;

means for producing a transmission start instruction at a start time instant within a range from a time instant when transfer of one packet of data from said predetermined memory to said buffer memory means is commenced until a time instant when said one packet of data transfer is accomplished, wherein the lower a data transfer speed from said predetermined memory to said buffer memory means is relative to a transmission speed of said network, the later said start time instant is set; and means for causing said control means to commence transmission of said data processed by said protocol processing to said network at a time instant in between a time instant when said transmission start instruction is produced and a time instant when said protocol processing is terminated;

wherein said transmission start instruction producing means comprises:

means for receiving data amount information indicative of an amount of data included in said one packet of data, means for obtaining passed data amount information indicative of an amount of data of said one packet of data which has been transferred to said buffer memory means, means for obtaining reference data amount information indicative of a reference amount of data less than or equal to said amount of data included in said one packet of data, wherein the lower said data transfer speed from said predetermined memory to said buffer memory means is relative to said transmission speed of said network, the more said reference data amount information is, and means for comparing said passed data amount information with said reference data amount information and for producing said transmission start instruction when said passed data amount information is more than or equal to said reference data amount information.

3. A communication control equipment for transmitting data in an external predetermined memory to a network, comprising:

buffer memory means for temporarily holding data transferred thereto;

data transfer means for transferring data between said predetermined memory and said buffer memory means;

means for executing a protocol processing with regard to said data held in said buffer memory means;

control means for controlling a transmission of said data processed by said protocol processing to said network;

means for producing a transmission start instruction at a start time instant within a range from a time instant when transfer of one packet of data from said predetermined memory to said buffer memory means is commenced until a time instant when said one packet of data transfer is accomplished, wherein the lower a data transfer speed from said predetermined memory to said buffer memory means is relative to a transmission speed of said network, the later said start time instant is set; and means for causing said control means to commence transmission of said data processed by said protocol processing to said network at a time instant in between a time instant when said transmission start instruction is produced and a time instant when said protocol processing is terminated;

wherein said transmission start instruction producing means comprises:

means for receiving data amount information indicative of an amount of data included in said one packet of data, means for obtaining remaining data amount information indicative of an amount of data of said one packet of data which has not yet been transferred to said buffer memory means, means for holding reference ratio information indicative of a reference ratio corresponding to a ratio of said remaining data amount information to said data amount information, wherein the lower said data transfer speed from said predetermined memory to said buffer memory means is relative to said transmission speed of said network, the less said reference ratio information is, means for obtaining reference data amount information representative of a product of said data amount information and said reference ratio information, and means for comparing said remaining data amount information with said reference data amount information and for producing said transmission start instruction when said remaining data amount information is less than or equal to said reference data amount information.

4. A communication control equipment for transmitting data in an external predetermined memory to a network, comprising:

buffer memory means for temporarily holding data transferred thereto;

data transfer means for transferring data between said predetermined memory and said buffer memory means;

means for executing a protocol processing with regard to said data held in said buffer memory means;

control means for controlling a transmission of said data processed by said protocol processing to said network;

means for producing a transmission start instruction at a start time instant within a range from a time instant when transfer of one packet of data from said predetermined memory to said buffer memory means is commenced until a time instant when said one packet of data transfer is accomplished, wherein the lower a data transfer speed from said predetermined memory to said buffer memory means is relative to a transmission speed of said network, the later said start time instant is set; and means for causing said control means to commence transmission of said data processed by said protocol processing to said network at a time instant in between a time instant when said transmission start instruction is produced and a time instant when said protocol processing is terminated;

wherein said transmission start instruction producing means comprises:

means for receiving data amount information indicative of an amount of data included in said one packet of data, means for obtaining passed data amount information indicative of an amount of said one packet of data which has been transferred to said buffer memory means, means for holding reference ratio information indicative of a reference ratio corresponding to a ratio of said passed data amount information to said data amount information, the lower said data transfer speed from said predetermined memory to said buffer memory means is relative to said transmission speed of said network, the more said reference ratio information is, means for obtaining reference data amount information representative of a product of said data amount information and said reference ratio information, and means for comparing said passed data amount information with said reference data amount information and for producing said transmission start instruction when said passed data amount information is more than or equal to said reference data amount information.

5. A communication control method for transmitting data in an external predetermined memory to a network with employment of a communication control equipment which includes buffer memory means for temporarily holding data transferred thereto, data transfer means for transferring data between said predetermined memory and said buffer memory means, means for executing a protocol processing with regard to said data held in said buffer memory means, and control means for controlling a transmission of said data processed by said protocol processing to said network, said communication control method comprising the steps of:

producing a transmission start instruction at a start time instant within a range from a time instant when transfer of one packet of data from said predetermined memory to said buffer memory means is commenced until a time instant when said one packet of data transfer is accomplished, wherein the lower a data transfer speed from said predetermined memory to said buffer memory means is relative to a transmission speed of said network, the later said start time instant is set; and causing said control means to commence said transmission of said data processed by said protocol processing to said network at a time instant in between a time instant when said transmission start instruction is produced and a time instant when the protocol processing is terminated;

wherein said transmission start instruction producing step comprises the step of:

receiving data amount information indicative of an amount of data included in said one packet of data, obtaining remaining data amount information indicative of an amount of data of said one packet of data which has not yet been transferred to said buffer memory means, obtaining a reference data amount information indicative of a reference amount of data less than or equal to said amount of data, wherein the lower said data transfer speed from said predetermined memory to said buffer memory means is relative to said transmission speed of said network, the less said reference data amount information is, and comparing said remaining data amount information with said reference data amount information and for producing said transmission start instruction when said remaining data amount information is less than or equal to said reference data amount information.

6. A communication control method for transmitting data in an external predetermined memory to a network with employment of a communication control equipment which includes buffer memory means for temporarily holding data transferred thereto, data transfer means for transferring data between said predetermined memory and said buffer memory means, means for executing a protocol processing with regard to said data held in said buffer memory means, and control means for controlling a transmission of said data processed by said protocol processing to said network, said communication control method comprising the steps of:

producing a transmission start instruction at a start time instant within a range from a time instant when transfer of one packet of data from said predetermined memory to said buffer memory means is commenced until a time instant when said one packet of data transfer is accomplished, wherein the lower a data transfer speed from said predetermined memory to said buffer memory means is relative to a transmission speed of said network, the later said start time instant is set; and causing said control means to commence said transmission of said data processed by said protocol processing to said network at a time instant in between a time instant when said transmission start instruction is produced and a time instant when the protocol processing is terminated;

wherein said transmission start instruction producing step comprises the steps of:

receiving data amount information indicative of an amount of data included in said one packet of data, obtaining passed data amount information indicative of an amount of data of said one packet of data which has been transferred to said buffer memory means, obtaining reference data amount information indicative of a reference amount of data less than or equal to said amount of data, wherein the lower said data transfer speed from said predetermined memory to said buffer memory means is relative to said transmission speed of said network, the more said reference data amount information is, and comparing said passed data amount information with said reference data amount information and for producing said transmission start instruction when said passed data amount information is more than or equal to said reference data amount information.

7. A communication control method for transmitting data in an external predetermined memory to a network with employment of a communication control equipment which includes buffer memory means for temporarily holding data transferred thereto, data transfer means for transferring data between said predetermined memory and said buffer memory means, means for executing a protocol processing with regard to said data held in said buffer memory means, and control means for controlling a transmission of said data processed by said protocol processing to said network, said communication control method comprising the steps of:

producing a transmission start instruction at a start time instant within a range from a time instant when transfer of one packet of data from said predetermined memory to said buffer memory means is commenced until a time instant when said one packet of data transfer is accomplished, wherein the lower a data transfer speed from said predetermined memory to said buffer memory means is relative to a transmission speed of said network, the later said start time instant is set; and causing said control means to commence said transmission of said data processed by said protocol processing to said network at a time instant in between a time instant when said transmission start instruction is produced and a time instant when the protocol processing is terminated;

wherein said transmission start instruction producing step comprises the steps of:

receiving data amount information indicative of an amount of data included in said one packet of data, obtaining remaining data amount information indicative of an amount of data of said one packet of data which has not yet been transferred to said buffer memory means, holding reference ratio information indicative of a reference ratio corresponding to a ratio of said remaining data amount information to said data amount information, wherein the lower said data transfer speed from said predetermined memory to said buffer memory means is relative to said transmission speed of said network, the less said reference ratio information is, obtaining reference data amount information representative of a product of said data amount information and said reference ratio information, and comparing said remaining data amount information with said reference data amount information and for producing said transmission start instruction when said remaining data amount information is less than or equal to said reference data amount.

8. A communication control method for transmitting data in an external predetermined memory to a network with employment of a communication control equipment which includes buffer memory means for temporarily holding data transferred thereto, data transfer means for transferring data between said predetermined memory and said buffer memory means, means for executing a protocol processing with regard to said data held in said buffer memory means, and control means for controlling a transmission of said data processed by said protocol processing to said network, said communication control method comprising the steps of:

producing a transmission start instruction at a start time instant within a range from a time instant when transfer of one packet of data from said predetermined memory to said buffer memory means is commenced until a time instant when said one packet of data transfer is accomplished, wherein the lower a data transfer speed from said predetermined memory to said buffer memory means is relative to a transmission speed of said network, the later said start time instant is set; and causing said control means to commence said transmission of said data processed by said protocol processing to said network at a time instant in between a time instant when said transmission start instruction is produced and a time instant when the protocol processing is terminated;

wherein said transmission start instruction producing step comprises the steps of:

receiving data amount information indicative of an amount of data included in said one packet of data, obtaining passed data amount information indicative of an amount of data of said one packet of data which has been transferred to said buffer memory means, holding reference ratio information indicative of a reference ratio corresponding to a ratio of said passed data amount information to said data amount information, wherein the lower said data transfer speed from said predetermined memory to said buffer memory means is relatively with respect to said transmission speed of said network, the more said reference ratio information is, obtaining reference data amount information representative of a product of said data amount information and said reference ratio information based, and comparing said passed data amount information with said reference data amount information and for producing said transmission start instruction when said passed data amount information is more than or equal to said reference data amount information.

9. A data transfer equipment for transferring data stored in a first memory space to external of said data transfer equipment via a second memory space, said data transfer equipment comprising:

means for receiving data amount information indicative of an amount of data included in one packet of transfer data;

means for obtaining remaining data amount information indicative of an amount of data of said one packet of transfer data which has not yet been transferred to said second memory space;

means for holding reference data amount information indicative of a reference amount of data externally designated, said reference data amount information being less than or equal to said data amount information; and means for comparing said remaining data amount information with said reference data amount information and for producing a transfer start signal which is used to start transfer of data from said second memory space to external of said data transfer equipment when said remaining data amount information is less than or equal to said reference data amount information.

10. A data transfer equipment for transferring data stored in a first memory space to external of said data transfer equipment via a second memory space, said data transfer equipment comprising:

means for receiving data amount information indicative of an amount of data included in one packet of transfer data;

means for obtaining passed data amount information indicative of an amount of data of said one packet of transfer data which has been transferred to said second memory space;

means for holding reference data amount information indicative of a reference amount of data externally designated, said reference data amount information being less than or equal to said data amount information; and means for comparing said passed data amount information with said reference data amount information and for producing a transfer start signal which is used to start transfer of data from said second memory space to external of said data transfer equipment when said passed data amount information is more than or equal to said reference data amount information.

11. A data transfer equipment for transferring data stored in a first memory space to external of said data transfer equipment via a second memory space, said data transfer equipment comprising:

means for receiving data amount information indicative of an amount of data included in one packet of transfer data;

means for obtaining remaining data amount information indicative of an amount of data of said one packet of transfer data which has not yet been transferred to said second memory space;

means for holding reference ratio information indicative of an externally designated reference ratio corresponding to a ratio of said remaining data amount information to said data amount information;

means for obtaining reference data amount information indicative of a product of said data amount information and said reference ratio information; and means for comparing said remaining data amount information with said reference data amount information and for producing a transfer start signal which is used to start transfer of data from said second memory space to external of said data transfer equipment when said remaining data amount information is less than or equal to said reference data amount information.

12. A data transfer equipment for transferring data stored in a first memory space to external of said data transfer equipment via a second memory space, said data transfer equipment comprising:

means for receiving data amount information indicative of an amount of data included in one packet of transfer data;

means for obtaining passed data amount information indicative of an amount of data of said one packet of transfer data which has been transferred to said second memory space;

means for holding reference ratio information indicative of an externally designated reference ratio corresponding to a ratio of said passed data amount information to said data amount information;

means for obtaining reference data amount information indicative of a product of said data amount information and said reference ratio information; and means for comparing said passed data amount information with said reference data amount information and for producing a transfer start signal which is used to start transfer of data from said second memory space to external of said data transfer equipment when said passed data amount information is more than or equal to said reference data amount information.

13. A data transfer method for transferring data stored in a first memory space to external of a data transfer equipment via a second memory space said data transfer equipment, comprising the steps of:

receiving data amount information indicative of an amount of data included in one packet of transfer data:

obtaining remaining data amount information indicative of an amount of data of said one packet transfer data which has not yet been transferred to said second memory space;

holding reference data amount information indicative of a reference data amount externally designated, said reference data amount information being less than or equal to said data amount information; and comparing said remaining data amount information with said reference data amount information and for producing a transfer start signal which is used to start external transfer of data from said second memory space when said remaining data amount information is less than or equal to said reference data amount information.

14. A data transfer method for transferring data stored in a first memory space to external of a data transfer equipment via a second memory space said data transfer equipment, comprising the steps of:

receiving data amount information indicative of an amount of data included in one packet of transfer data;

obtaining passed data amount information indicative of an amount of data of said one packet of transfer data which has been transferred to said second memory space;

holding reference data amount information indicative of a reference data amount externally designated, said reference data amount information is less than or equal to said data amount information; and comparing said passed data amount information with said reference data amount information and for producing a transfer start signal which is used to start external transfer of data from said second memory space when said passed data amount information is more than or equal to said reference data amount information.

15. A data transfer method for transferring data stored in a first memory space to external of a data transfer equipment via a second memory space said data transfer equipment, comprising the steps of:

receiving data amount information indicative of an amount of data included in one packet transfer data;

obtaining remaining data amount information indicative of an amount of data of said one packet of transfer data which has not yet been transferred to said second memory space;

holding reference ratio information indicative of an externally designated reference ratio corresponding to a ratio of said remaining data amount information to said data amount information;

obtaining reference data amount information indicative of a product of said data amount information and said reference ratio information; and comparing said remaining data amount information with said reference data amount information and for producing a transfer start signal which is used to start external transfer of data from said second memory space when said remaining data amount information is less than or equal to said reference data amount information.

16. A data transfer method for transferring data stored in a first memory space to external of a data transfer equipment via a second memory space said data transfer equipment, comprising the steps of:

receiving data amount information indicative of an amount of data included in one packet of transfer data;

obtaining passed data amount information indicative of an amount of data of said one packet of transfer data which has been transferred to said second memory space;

holding reference ratio information indicative of an externally designated reference ratio corresponding to a ratio of said passed data amount information to said data amount information;

obtaining reference data amount information indicative of a product between said data amount information and said reference ratio information; and comparing said passed data amount information with said reference data amount information and for producing a transfer start signal which is used to start external transfer of data from said second memory space when said passed data amount information is more than or equal to said reference data amount information.

* * * * *